US012705755B2

(12) United States Patent
Tyagi et al.

(10) Patent No.: US 12,705,755 B2
(45) Date of Patent: Aug. 11, 2026

(54) PRECISE BOOK PAGE BOUNDARY DETECTION USING DEEP MACHINE LEARNING MODEL AND IMAGE PROCESSING ALGORITHMS

(71) Applicant: Adobe Inc., San Jose, CA (US)

(72) Inventors: Tushar Tyagi, Faridabad (IN); Prasenjit Mondal, Noida (IN); Deepanshu Arora, Ghaziabad (IN); Damandeep Singh Banga, Noida (IN); Curtis Wigington, Annandale, VA (US); Ayush Pant, Noida (IN)

(73) Assignee: Adobe Inc., San Jose, CA (US)

( * ) Notice: Subject to any disclaimer, the term of this patent is extended or adjusted under 35 U.S.C. 154(b) by 165 days.

(21) Appl. No.: 18/457,185

(22) Filed: Aug. 28, 2023

(65) Prior Publication Data

US 2024/0404070 A1 Dec. 5, 2024

Related U.S. Application Data

(60) Provisional application No. 63/505,380, filed on May 31, 2023.

(51) Int. Cl.
*G06T 7/13* (2017.01)
*G06T 3/4046* (2024.01)

(52) U.S. Cl.
CPC .............. *G06T 7/13* (2017.01); *G06T 3/4046* (2013.01); *G06T 2200/24* (2013.01);
(Continued)

(58) Field of Classification Search
CPC ..... G06T 7/13; G06T 3/4046; G06T 2200/24; G06T 2207/30176
See application file for complete search history.

(56) References Cited

U.S. PATENT DOCUMENTS 10,970,847 B2 4/2021 Mondal et al.
2006/0033967 A1* 2/2006 Brunner ............... G06V 10/242
358/474

(Continued)

OTHER PUBLICATIONS

Yuan, Y., Xie, J., Chen, X., Wang, J. (2020). SegFix: Model-Agnostic Boundary Refinement for Segmentation. In: Vedaldi, A., Bischof, H., Brox, T., Frahm, JM. (eds) Computer Vision â ECCV 2020. ECCV 2020. Lecture Notes in Computer Science(), vol. 12357. Springer, Cham. (Year: 2020).*

(Continued)

*Primary Examiner* — Emily C Terrell
*Assistant Examiner* — Jacqueline R Zak
(74) *Attorney, Agent, or Firm* — Nicholson De Vos Webster & Elliott LLP

(57) ABSTRACT

Embodiments are disclosed for a precise book page boundary detection using deep machine learning model and image processing. The method may include generating, based on inputting a digital image to a convolutional neural segmentation network, a plurality of outputs comprising first output for a boundary of a left page of a spread of a physical book and second output for a boundary of a right page of the spread. A first thin pixel mask and a second thin pixel mask are determined for the left page and the right page based on the first and second outputs. A first quadrilateral and a second quadrilateral are determined based on the first and second thin pixel masks. At least one of the first or second quadrilateral is rendered in a display showing the outer boundary of the left or right page.

20 Claims, 17 Drawing Sheets

(52) U.S. Cl.
CPC ............... *G06T 2207/20081* (2013.01); *G06T 2207/20084* (2013.01); *G06T 2207/30176* (2013.01)

(56) References Cited

U.S. PATENT DOCUMENTS

| | | | | |
|---|---|---|---|---|
| 2012/0294528 | A1* | 11/2012 | Li | H04N 1/3873<br>382/173 |
| 2017/0098310 | A1* | 4/2017 | Chefd'hotel | G06T 7/13 |
| 2017/0309001 | A1* | 10/2017 | Zagaynov | G06V 10/30 |

OTHER PUBLICATIONS

Acuna, D., Kar, A., & Fidler, S. (2019). Devil is in the edges: Learning semantic boundaries from noisy annotations. In Proceedings of the IEEE/CVF conference on computer vision and pattern recognition (pp. 11075-11083). (Year: 2019).*

Li et al., "Pixel Offset Regression (POR) for Single-shot Instance Segmentation", 2018 15th IEEE International Conference on Advanced Video and Signal Based Surveillance (AVSS), Nov. 2018, pp. 1-6.

Stack Overflow, "Python 3.x—Detect Middle Vertical Line of a Double Side Scanned Image", Available Online at <https://stackoverflow.com/questions/68117603/detect-middle-vertical-line-of-a-double-side-scanned-image/6812339#68123393>, Jun. 24, 2021, 7 pages.

* cited by examiner

PRECISE BOOK PAGE BOUNDARY DETECTION SYSTEM 1500

PAGE BOUNDARY DEEP MACHINE LEARNING MODEL 1502

THIN PIXEL MASK CALCULATOR 1504

SPREAD BOUNDARY CALCULATOR 1506

BIND LINE CALCULATOR 1508

INDIVIDUAL PAGE BOUNDARY CALCULATOR 1510

STORAGE MANAGER 1512

INPUT IMAGE 1514

OUTPUT IMAGE 1516

LEFT PAGE MODEL OPUTPUTS 1518

RIGHT PAGE MODEL OPUTPUTS 1520

LEFT PAGE THIN PIXEL MASK 1522

RIGHT PAGE THIN PIXEL MASK 1524

SPREAD BOUNDARY 1526

BEST BIND LINE 1528

LEFT QUADRILATERAL 1530

RIGHT QUADRILATERAL 1532

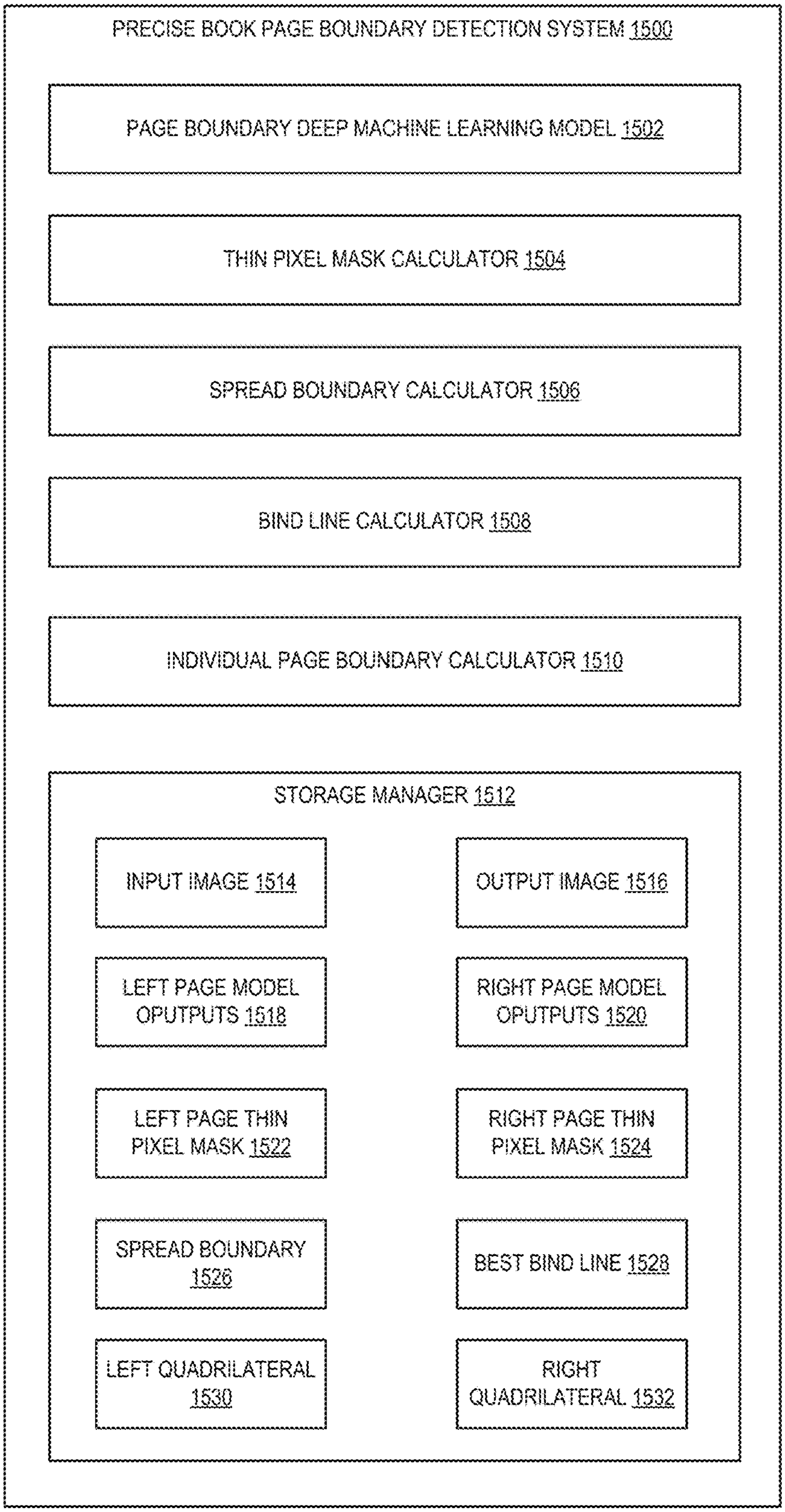

FIG. 15

PRECISE BOOK PAGE BOUNDARY DETECTION USING DEEP MACHINE LEARNING MODEL AND IMAGE PROCESSING ALGORITHMS

CROSS-REFERENCE TO RELATED APPLICATION

This application claims the benefit of priority of U.S. provisional patent application 63/505,380, filed May 31, 2023, the entire contents of which is hereby incorporated by reference.

BACKGROUND

Various computing devices, including mobile devices such as smart phones, have powerful integrated cameras or scanners that facilitate various digital imaging-based applications. Some of these applications can convert images of physical books into digital files in a process referred to as "scanning." For example, a user can photograph a physical book, creating a digital image of the book. The image can be converted by a scanning application into a digital file representing a copy of the book. This converting can include the scanning application converting typed, handwritten, or printed text appearing the scanned book into machine-encoded text. A non-trivial technical challenge for scanning applications is automatic book page boundary detection.

SUMMARY

Introduced here are techniques that allow a user using a scanning application to scan left and right book pages individually, with only a single image capture, thereby increasing the user's productivity. The scanning application uses a deep machine learning model and an image processing algorithm to compute thin and precise boundaries of individual book pages from the image capture.

More specifically, in one or more embodiments, a digital image of a physical book laid open to a two-page spread is captured by an image capturing device such as a smart phone, tablet computer, or other portable computing device. The digital image is input to a convolutional neural segmentation network which generates a plurality of outputs including one or more outputs for the left page of the spread and one or more outputs for the right page of the spread. Thin pixel masks for the outer boundaries of the left and right pages are determined based on sets of the model outputs. Quadrilaterals for the outer boundaries of the left and right pages are determined based on the thin pixel masks. The input digital image or a version thereof is displayed on a video display with at least one of the quadrilaterals rendered in the display and precisely delineating the outer boundary of the left or right page of the two-page spread.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 15 illustrates a schematic diagram of a precise book page boundary detection system, in accordance with one or more embodiments.

DETAILED DESCRIPTION

Techniques are disclosed for precise book page boundary detection using deep machine learning model and image processing algorithms.

Existing document boundary detection algorithms cannot adequately determine precise book page boundaries from an image capture. These algorithms compute a document's boundary by fitting a quadrilateral to the document boundary. As such, these algorithms fit the quadrilateral to the external book border rather than to the individual pages. In addition, because of the multi-edge warped boundary of a book when laid open, these algorithms too often include a significant portion of the image background in the quadrilateral or crop a significant portion of a page from the quadrilateral.

Users could attempt to overcome the deficiencies of the existing algorithms by capturing two images, one for each page of the spread, and then manually adjust the quadrilateral boundaries for each page to get a proper fit. However, this is a tedious and time-consuming process for the user.

Techniques disclosed herein overcome the deficiencies of existing approaches allowing a user to scan the left and right pages of a book spread with only a single image capture. A book page boundary detection application uses deep machine learning model and image processing algorithms to compute thin and precise boundaries of individual book pages from the image capture.

The advantages of the techniques are several. Precise boundaries of individual book pages are automatically determined from a single image capture. The determination of the precise book page boundaries is resilient to occlusions in the image such as a finger or fingers holding the book open. The determination is of the internal book page boundaries (as opposed to the external book boundary) thereby providing a better user reading experience and improving other image processing tasks such as dewarping.

Figure 1:
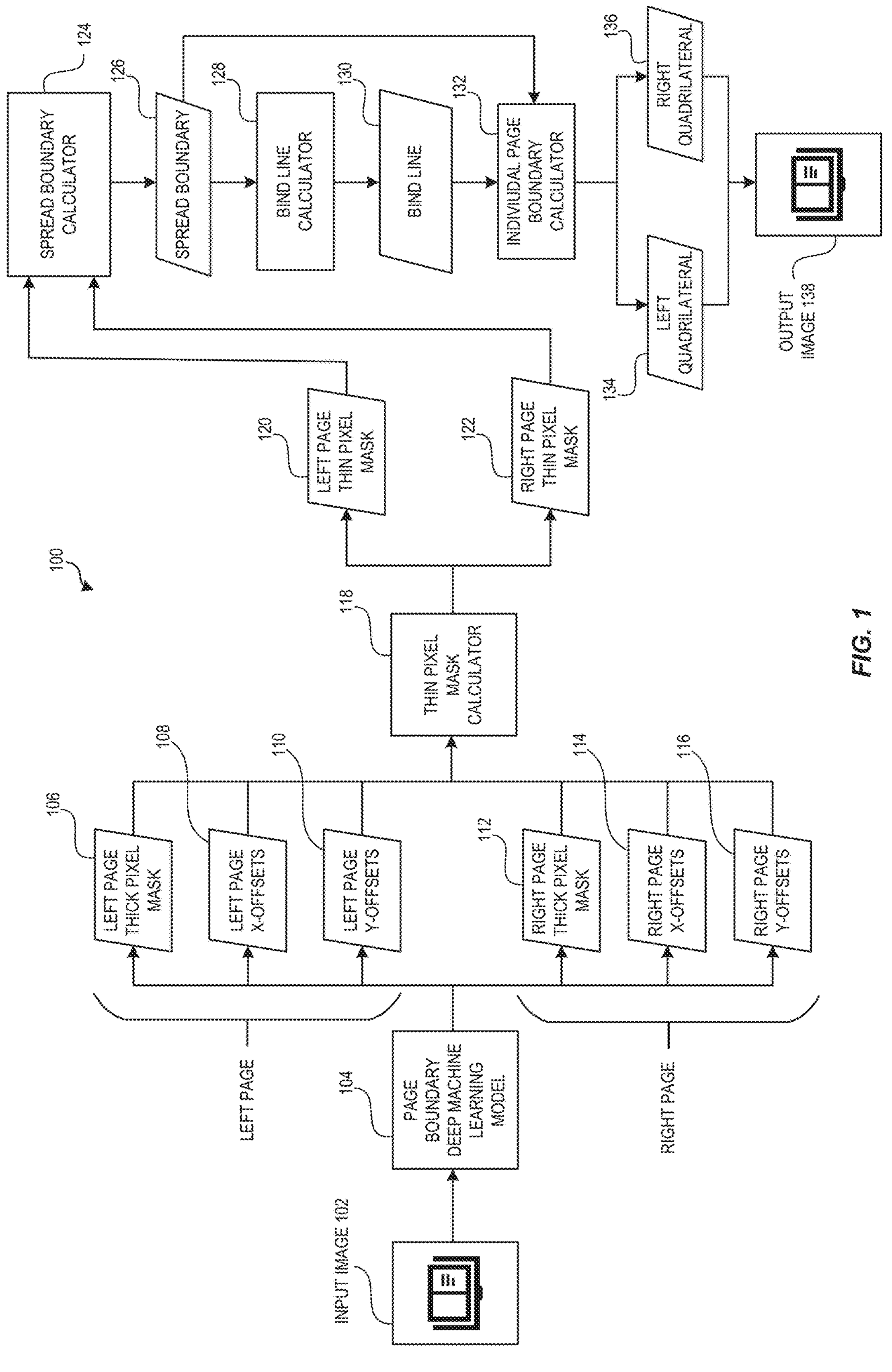
FIG. 1 shows an example system for precise book page boundary detection using deep machine learning model and image processing algorithms, in accordance with an embodiment of the present disclosure.

FIG. 1 shows an example system 100 for precise book page boundary using deep machine learning model and image processing algorithms, in accordance with an embodiment of the present disclosure. In summary, system 100 accepts input image 102. Input image 102 is input to page boundary detection deep machine learning model 104 which outputs two set of outputs: one for a left page and one for a right page. The left page outputs include left page thick pixel mask 106, left page x-offsets 108, and left page y-offsets 110. The right page outputs include right page thick pixel mask 112, right page x-offsets 114, and right page y-offsets 116. Both sets of outputs are input to thick pixel mask calculator which produces as output left page thin pixel mask 120 and right page thin pixel mask 122. The left and right page thin pixel masks 120 and 122 are input to spread boundary calculator 124 which produces as output spread boundary 126. Spread boundary 126 is input to bind line calculator 128 which produces as output bind line 130. Bind line 130 is input to individual page boundary calculator 132 which produces left quadrilateral 134 and right quadrilateral 136, one or both of which are rendered in output image 138.

Input image 102 is a digital photograph of a physical book opened to a two-page spread (or just "spread") having a left page and a right page. While books are used in many examples herein, the disclosed techniques can be applied equivalently to other types of printed materials having two-page spreads such as any or all of: magazines, newspapers, brochures and pamphlets, catalogs, photo albums, calendars, art and design portfolios, comic books and graphic novels, advertising campaigns. Thus, unless otherwise clear in context, reference to a book herein can be substituted with another type of printed material having a two-page spread without loss of generality.

As used herein, the term "left page" is used to refer to one page of a two-page spread and the term "right page" is used to refer to the other (opposite) page of the two-page spread, regardless of the orientation of the two-spread spread. For example, if input image 102 is captured when the two-page spread is turned upside down relative to the camera orientation, then the left page can be the page that would be on the right side of the two-page spread when orientated for reading by a person. Typically, however, it may be natural for a person to orient the two-page spread in the reading orientation relative to the camera orientation when capturing input image 102, even though the techniques do not require such orientation.

Input image 102 or an image from which image input 102 is derived can be captured by a digital camera such as, for example, a digital camera integrated into a smart phone, a scanner, or other image capturing device. For example, a user may capture a photograph of, or scan, a book opened to a two-page spread. In some cases, the input image 102 also includes a background that is not part of the book such as a physical medium on which the book is placed such as, for example, a table, a counter, a floor, or other physical surface on which the book rests when input image 102 is captured.

In some embodiments, input image 102 or the image on which input image 102 is based is captured by the image capturing device while a scanning application of the device is in a "book mode." For example, the scanning application may support a "document mode" for scanning a single-page document and support a "book mode" for scanning a two-page spread of a physical book. For example, a user may select a book mode option of the scanning application before or while using a camera of the image capturing device to capture a digital photograph or video of a physical book lying on a surface and open to a two-page spread. Alternatively, the device may use computer vision techniques to automatically detect that a physical book open a two-page spread is being scanned as opposed to a single paper or single page document. For example, the user may select an option of the scanning application to start a scan. Selecting this option may cause the camera of the device to be activated and begin imaging and capturing images. As the user holds the camera in the direction of the physical book open to a two-page spread, images captured by the camera can be processed by a machine learning or other computer vision process of the scanning application or the imaging capturing device to determine whether the object being imaged is a book open to a two-page spread or a single page document. Upon detecting that what is being imaged is a book open to a two-page spread, the scanning application may automatically enter the book mode. Alternatively, the scanning application may automatically prompt the user to confirm entry into the book mode or to otherwise confirm that what is being scanned is a book (e.g., as opposed to a single-page document). While in the book mode, the scanning application and the image capturing device may use techniques disclosed herein to draw quadrilaterals around the outer boundaries of the individual pages of the two-page spread that is imaged.

System 100 may be included as part of the image capturing device. For example, the image capturing device may be a smart phone or a tablet computer or other handheld computing device with an integrated camera and an integrated video display. System 100 can be included in such a device to process input image 102 captured by the integrated camera and produce output image 138. The resulting output image 138 may be displayed on the integrated video display.

Output image 138 presents input image 102 (or a resized version thereof) with a drawing of a quadrilateral around the outer boundary of a page where the quadrilateral is determined at least in part using techniques disclosed herein. Output image 138 can include a drawing of a quadrilateral (referred to herein as left quadrilateral 134) around the outer boundary of the left page. Output image 138 can include a drawing of a quadrilateral (referred to herein as right quadrilateral 136) around the outer boundary of the right page. Alternatively, output image 138 can include a drawing of both left quadrilateral 134 and right quadrilateral 136.

Figure 2:
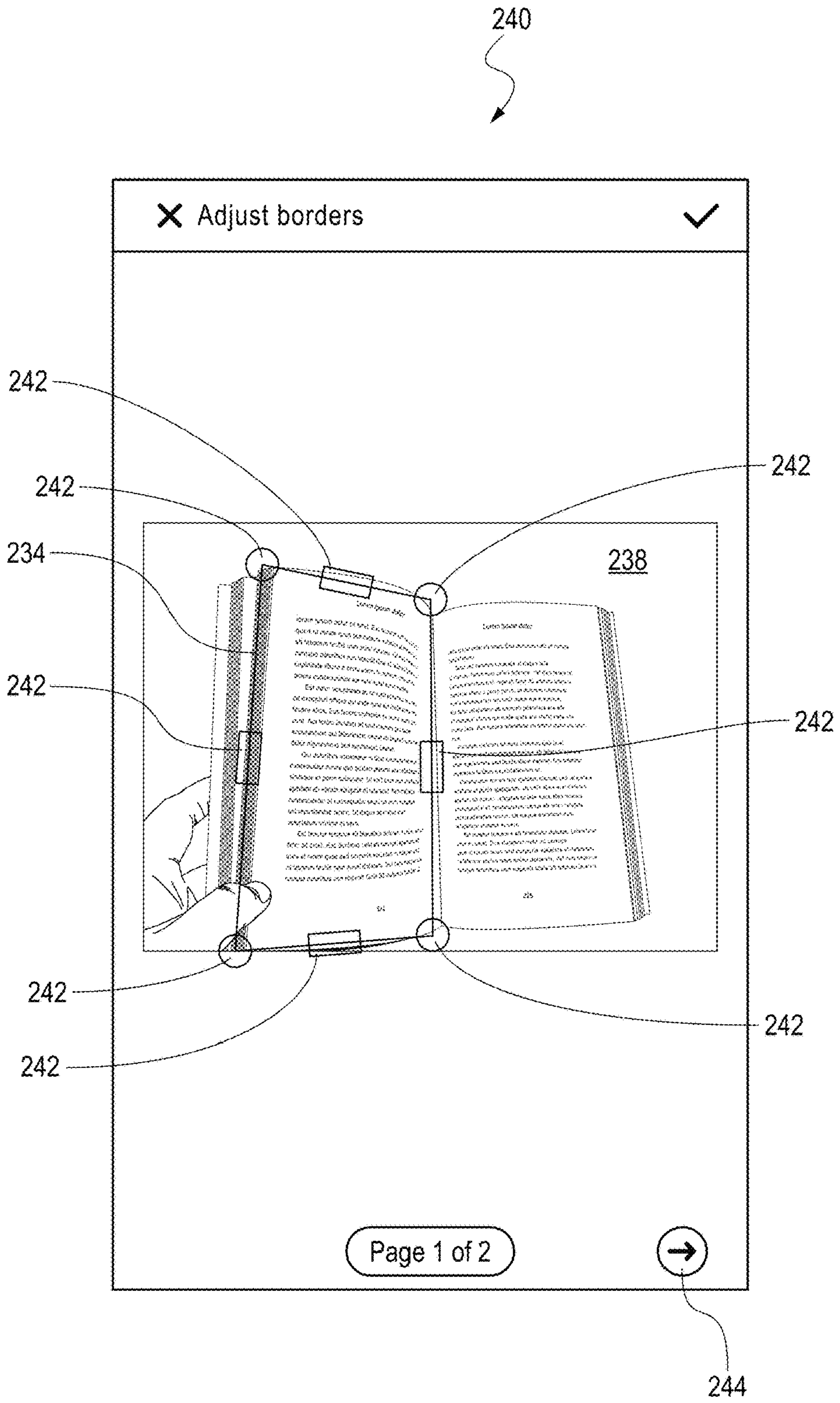
FIG. 2 illustrates an example graphical user interface presenting an example of an output image, in accordance with an embodiment of the present disclosure.

For example, FIG. 2 illustrates example graphical user interface 240 presenting example output image 238. Graphical user interface 240 (and the other graphical user interfaces herein) may be displayed, for example, on the video display of the image capturing device. In this example, left quadrilateral 234 is drawn showing a preliminary boundary of the left page determined according to techniques disclosed herein. Graphical user interface 240 also provides graphical user interface controls 242 for adjusting the borders of left quadrilateral 234. If the user is satisfied with the borders of left quadrilateral 234, then the user may activate controls 244 to view and potentially adjust the borders of the quadrilateral determined for the right page, as shown in FIG. 3.

Figure 3:
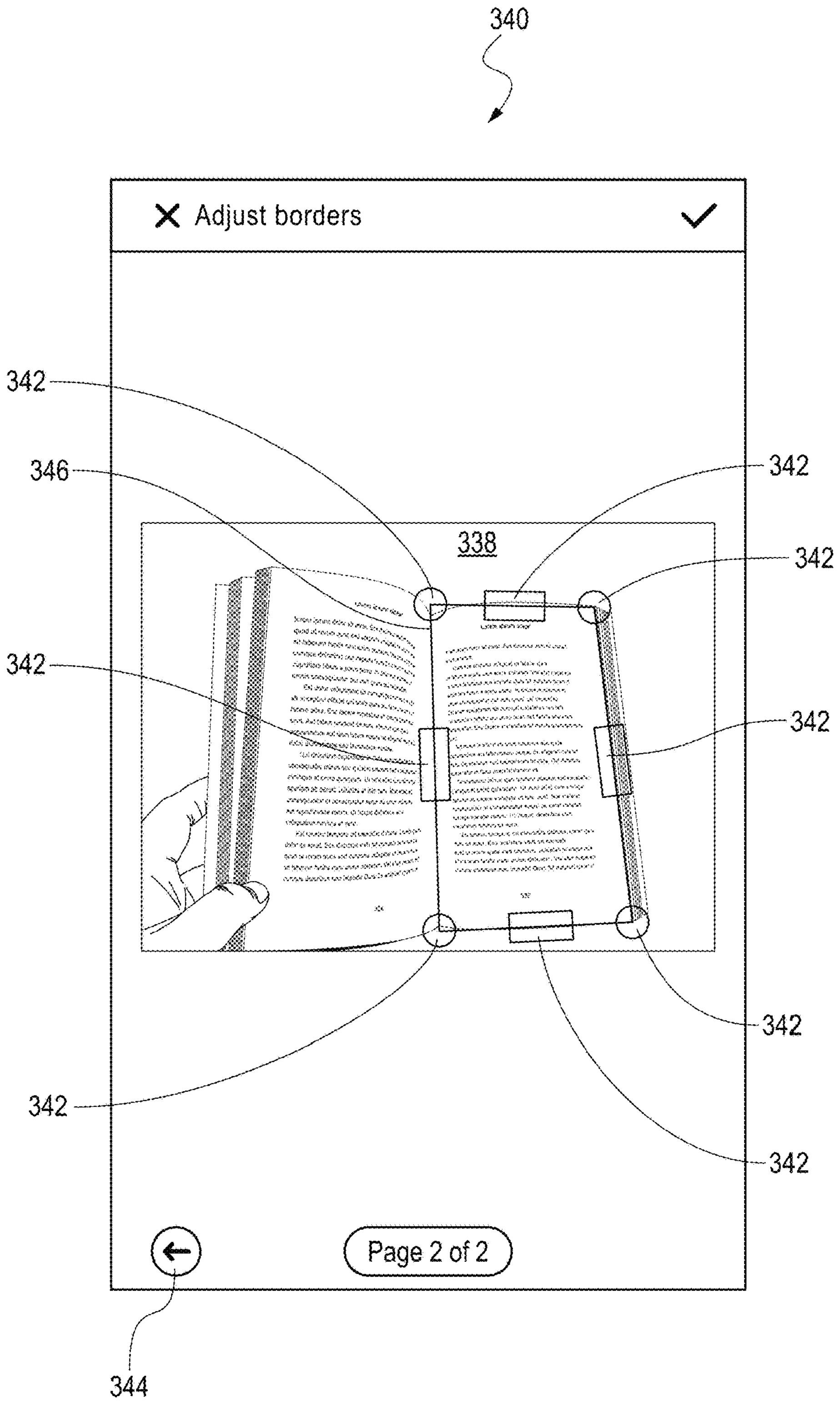
FIG. 3 illustrates an example graphical user interface presenting an example of an output image, in accordance with an embodiment of the present disclosure.

For example, FIG. 3 illustrates example graphical user interface 340 presenting an example of output image 338. In this example, right quadrilateral 334 is drawn showing a preliminary boundary of the right page determined according to techniques disclosed herein. Graphical user interface 340 also provides graphical user interface controls 342 for adjusting the borders of right quadrilateral 336. The user may activate graphical user interface controls 344 to return to adjusting the border of left quadrilateral 234.

Left quadrilateral 134 and right quadrilateral 136 as determined by techniques disclosed herein, including any subsequent adjustment by the user, determine the portions of output image 138 that are within the boundaries of the left page and the right page, respectively. Output image 138 may undergo scanning processing based on the determined quadrilaterals 134 and 136 including image processing, optical character recognition (OCR), or other suitable scanning processing. The result of scanning processing may be a scanned digital document file or set of digital document files in a digital document file format that encompasses the left page and the right page in the digital document file format. For example, the scanned digital document file format can include the scanned left page and the scanned right page in Portable Document Format (PDF), or another suitable digital document file format.

Image processing may include enhancing the quality and correcting imperfections in output image 138 or the areas of output image 138 within quadrilaterals 134 and 136. Such processing may include adjustments to brightness, contrast, color balance, sharpness, or other image properties of output image 138 or the areas within quadrilaterals 134 and 136. Such processing may also include cropping, deskewing, or dewarping output image 138 or the areas of output image 138 within quadrilaterals 134 and 136 or removing any background noise or artifacts of output image 138 or the areas of output image 138 within quadrilaterals 134 and 136. Scanning processing may include optical character recognition (OCR) in which scanned text of the left page and right page is converted into editable and searchable digital or machine-readable text. The OCR-recognized text may then be stored in a digital document file in the target digital document file format.

While scanning processing may be performed on output image 138, scanning processing may be performed on a different sized (different resolution) image version such as, for example, input image 102, or input image 102 before any downsampling is applied to input image 102 (e.g., the original image captured by the image capturing device). In this case, left quadrilateral 134 and right quadrilateral 136 as determined according to techniques disclosed herein, including any subsequent adjustment of the borders by a user, may be scaled, or resized to determine the corresponding left page area or right page area of the image on which scanning processing is performed or is focused on.

Page boundary deep machine learning model 104 is trained to produce a plurality of outputs based on processing input image 102. Some of the outputs are for the left page in input image 102 and other outputs are for the right page in input image 102. The outputs include a thick pixel mask for the page boundary, offsets on the X axis of the input image 102 to the page boundary, and offsets on the Y axis of the input image 102 to the page boundary. Specifically, the outputs for the left page include left page thick pixel mask 106, left page x-offsets 108, and left page y-offsets 110. The output for the right page includes right page thick pixel mask 112, right page x-offsets 114, and right page y-offsets 116.

Page boundary deep machine learning model 104 may encompass U-Net style or other suitable convolutional neural image segmentation network for processing input image 102. For example, instead of a U-Net style network, page boundary deep machine learning model 104 may use another type of convolutional neural image segmentation network such as a pix-to-pix network. In any case, preferably, page boundary deep machine learning model 104 encompasses a deep machine learning architecture suitable for image translation tasks. For example, regarding architecture, model 104 may encompass an encoder-decoder network architecture where the encoder is configured to gradually reduce spatial resolution and capture high-level features and the decoder is configured to upsample the features and reconstruct the segmented image. As another example, model 104 may encompass a generate adversarial network (GAN) architecture having a generator network configured to map an input image to an output image and a discriminator network configured to distinguish between real and generated images. Model 104 may be trained in a supervised manner using labeled training data where input images and corresponding segmented images are used to compute the loss and update the parameters of model 104 parameters through backpropagation. A pixel-wise loss function may be used during training such as, for example, the mean squared error (MSE) or the binary cross-entropy (BCE) computed at the pixel-level. Additionally, an adversarial loss may be used in addition to a pixel-wise loss to train the discriminator network of a GAN in conjunction with training the generator of the GAN.

In some embodiments, model 104 is designed for resource-constrained devices such as smart phones, tablet computers, or other battery-powered handheld personal computing devices. For example, model 104 may include a mobilenetv2-based backbone. The mobilenetv2 U-Net style-network is designed for resource constrained devices such as mobile phones and smart phones yet still provides sufficient accuracy for the book scanning task.

In some embodiments, input image 102 is downsampled version of an image captured by the image capturing device. For example, input image 102 can be downsampled to a size that is effective at providing sufficient detail for high accuracy and supports fast inference times (reduced inference latency). For example, input image 102 can be a 384 pixel by 384 pixel red, green, and blue (RGB) image, or a 512 pixel by 512 pixel RGB image. However, no particular size (resolution) or image type of input image 102 is required. For example, input image 102 can be in different color space other than RGB such as, for example, grayscale, YUV, RGB plus depth information such as where distance is estimated by a depth sensor of the image capturing device or from the disparity of multiple cameras of the image capturing device.

Left page thick pixel mask 106 may be a binary mask of the same size (resolution) as input image 102. A pixel in left page thick pixel mask 106 may be one value (e.g., a value representing or indicating an RGB value for the color white) when the pixel is within N pixels of a boundary of the left page in input image 102 along a straight-line distance to the pixel's closest point on the outer boundary as determined by model 104. A pixel in left page thick pixel mask 106 is another value (e.g., a value representing or indicating an RGB value for the color black) when the pixel is not within N pixels of a boundary of the left page in input image 102 along a straight-line distance to the pixel's closest point on the outer boundary as determined by model 104. In some embodiments, N is ten pixels and may be selected empirically. However, N can be greater than ten or more the ten as selected according to the requirements of the particular implementation at hand.

Left page x-offsets 108 may be a tensor of the same size (resolution) as input image 102. A value in the tensor may represent a corresponding pixel in input image 102. A value in the tensor may be a floating-point value representing a distance along the x-axis of input image 102 of the corresponding pixel from the closest point on the outer boundary of the left page in input image 102 as determined by model 104. Floating-point values may be used to represent distances with greater precision. The value may be positive or negative to indicate the direction of the distance. For example, a value in the tensor of +5 may represent that a corresponding pixel is 5 pixels away along the x-axis from the outer boundary of the left page in the positive x-axis direction and a value in the matrix of −7 may represents that a corresponding pixel is 7 pixels away from the outer boundary of the left page in the negative x-axis direction.

Left page y-offsets 110 may be a tensor of the same size (resolution) as input image 102. Each value in the tensor may represent a corresponding pixel in input image 102. A value in the tensor may be a floating-point value representing a distance along the y-axis of input image 102 from the corresponding pixel to the closest point on the outer boundary of the left page in input image 102 as determined by model 104. Floating-point values may be used for representing distances with greater precision. The value may be positive or negative to indicate the direction of the distance from the outer boundary. For example, a value in the tensor of +3 may represents that the corresponding pixel is 3 pixels away along the y-axis from the outer boundary of the left page in the positive y-axis direction and a value in the matrix of −1 may represent that the corresponding pixel is 1 pixel away from the outer boundary of the left page in the negative y-axis direction.

Figure 4:
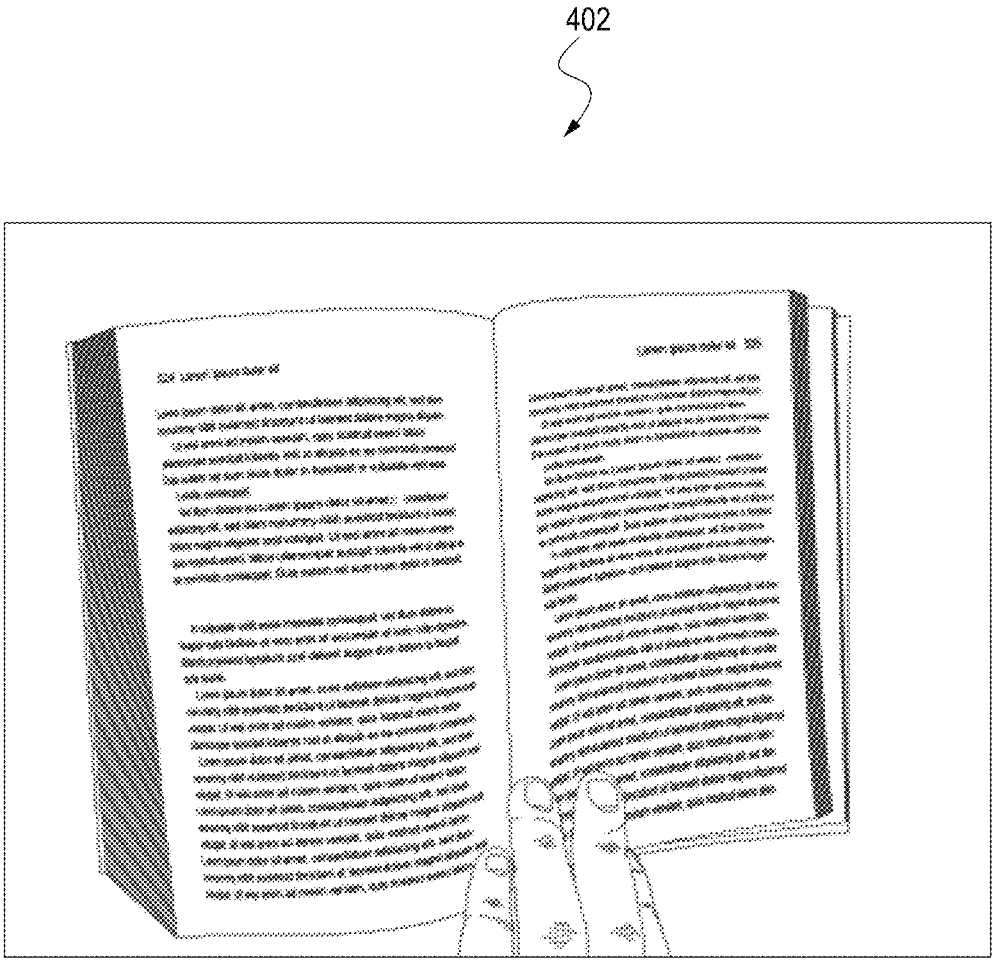
FIG. 4 illustrates an example input image that is down-sampled, in accordance with an embodiment of the present disclosure.
Figure 5:
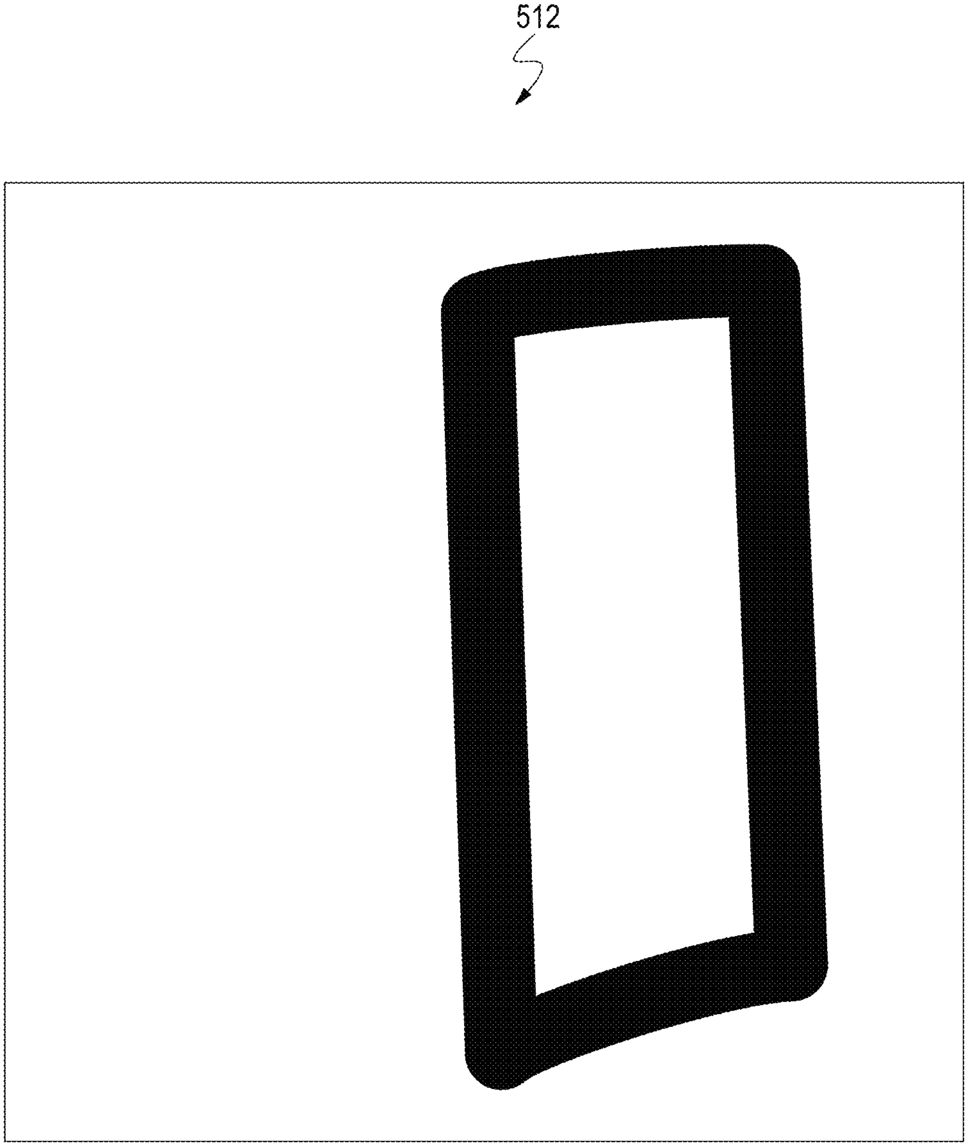
FIG. 5 illustrates a visualization of an example right page thick pixel mask for the outer boundary of the right page in an example input image as determined by a page boundary detection deep machine learning model, in accordance with an embodiment of the present disclosure.

Right page thick pixel mask 112, right page x-offsets 114, and right page y-offsets 116 correspond to left page thick pixel mask 106, left page x-offsets 108, and left page y-offsets 110, respectively, except for the outer boundary of the right page as determined by model 104. For example, FIG. 4 shows example input image 402 that is downsampled. FIG. 5 shows a visualization of example right page thick pixel mask 512 for the outer boundary of the right page in example input image 402 as determined by model 104. In mask 512, white pixels represent pixels of example input image 402 within ten pixels on a straight-line to the closest point on the outer boundary of the right page as determined by model 104 and black pixels represent pixels of example input image 402 that are farther away than ten pixels on a straight-line to the closest point on the outer boundary of the right page as determined by model 104.

When training model 104, the ground truth for a training example may be based on a polyline around the outer boundary of a page as depicted in an original image. For example, polylines may be collected by having users draw, trace, fit, or otherwise select polylines that correspond to the boundaries of pages depicted in images using a mouse or other pointing device, or a touch sensitive input device, or other suitable input. When training model 104, the ground truth for training model 104 may be generated by mapping the polyline coordinates from the coordinates of the original image to the coordinates of a resized (downsampled) input image for training. Each training example may encompass up to six ground truth tensors, three for the left page and three for the right page if polylines are available for both pages. However, a training example may encompass just three ground truth tensors for the left page or the right page if just one polyline is available for left page or the right page, respectively. A "tensor" can be a data structure for storing multi-dimensional data such as a multi-dimensional array, linked list, compressed sparse column (CSC) format, compressed sparse row (CSR) format, hash table, tree, or other suitable data structure.

A group of three ground truth tensors for a page depicted in a corresponding downsampled training example image includes a thick pixel mask tensor, an x-offsets tensor, and a y-offsets tensor. Each tensor has the same size (dimensions) as the corresponding downsampled training example image. Each value in each tensor corresponds to one pixel in the corresponding downsampled training example image. Each value in each tensor may be initialized to zero or some other default value.

A value in the thick pixel mask tensor may be set to the value representing/indicating that that corresponding pixel is within N pixels (e.g., 10 pixels) of a boundary of a page if the distance from center of the corresponding pixel to the closest point on the polyline is less than or equal to N. Otherwise, the value remains its default value.

A value in the x-offsets tensor may be set to the distance along the x-axis of the image between the corresponding pixel and the pixel's closest point on the polyline. Likewise, a value in the y-offsets tensor may be set to the distance along the y-axis of the image between the corresponding pixel and the pixel's closest point on the polyline. A value set in x-offsets tensor and the y-offsets tensor may be positive or negative depending on the direction along the x-axis or the y-axis of the image, respectively, the corresponding pixel is from its closest point on the polyline. In some embodiments, for computational efficiency when training without significantly affecting accuracy of model 104 when trained, only the values of the x-offsets tensor and the y-offsets tensor corresponding to pixels in the thick pixel mask tensor within N pixels of a boundary of a page are set to their distances along the x-axis or y-axis, respectively, from their closest point on the polyline and the remaining values corresponding to pixels farther than N pixels aways from a boundary of a page remain zero valued or at their default values.

In some embodiments, model 104 is trained using a cross-entropy loss for the thick pixel mask output and an L2-loss for the x-offsets and y-offsets output. For the x-offsets and y-offsets output during training, the loss may be masked by the ground truth thick pixel mask. As such, the L2-loss is computed only over the areas of the image where the ground truth thick pixel mask pixels are activated (e.g., pixels within N pixels of a boundary of a page). This may be done to improve the computational efficiency of training model 104 and reduce the time to train model 104 by avoiding computing the L2-loss and training gradients for x-offsets and y-offsets that are outside the ground truth thick pixel mask (e.g., for pixels farther away than N pixels of a boundary of a page).

In some embodiments, the training data set for training model 104 is based on a set of unique images (e.g., 1,500 unique images). Each image is of a book placed on a surface (e.g., a table, floor, counter, etc.) and laid-opened to a two-page spread. Some of the images may include occlusions such as fingers, pens, or other objects within the outer boundary of the spread including at the border or borders of the spread. Each image may capture the spread in its entirety along with some background (e.g., the surface on which the book is placed). A number (e.g., 30) of augmented images may be created for each unique image. Augmentation may encompass perspective transformations to improve accuracy of model 104 on images captured at different perspectives (e.g., different oblique angles). A perspective transformation may encompass treating the four corners of an image as control points and randomly perturbing each control point independently. Some images in the training data set may also be randomly rotated at 180 or 90 degrees. In some embodiments, model 104 is trained using an Adam optimizer with a learning rate of 0.0001 and a batch size of 32.

At inference time, left page thick pixel mask 106, left page x-offsets 108, and left page y-offsets 110 are input to thin pixel mask calculator 118 to compute left page thin pixel mask 120. Likewise, right page thick pixel mask 112, right page x-offsets 114, and right page y-offsets 116 are input to thin pixel mask calculator 118 to compute right page thin pixel mask 120. The same general algorithm is used by thin pixel mask calculator 118 for computing left page thin pixel mask 120 as right page thin pixel mask 122, except calculator 118 computes left page thin pixel mask 120 based on inputs 106, 108, and 110 and computes right page thin pixel mask 122 based on inputs 112, 114, and 116.

The following description of the algorithm used by thin pixel mask calculator 118 to compute a thin pixel mask for a page boundary refers generically to a thick pixel mask, x-offsets, and y-offsets. In the case of computing left page thin pixel mask 120, the thick pixel mask, the x-offsets, and the y-offsets are left page thick pixel mask 106, left page x-offsets 108, and left page y-offsets 110, respectively. In the case of computing right page thin pixel mask 122, the thick pixel mask, the x-offsets, and the y-offsets are right page thick pixel mask 112, right page x-offsets 114, and right page y-offsets 116, respectively.

The algorithm may start by initializing an accumulator tensor A with the same size (dimensions) as a target image. The size (dimension) of the target image can the size (dimension) of input image 102 or an upsampled version of input image 102. Thus, each value in accumulator tensor A logically corresponds to a respective pixel of the target image. Each value in accumulator tensor A may initially be zero or other suitable default value. Each pixel in the target image is located at a respective column c and a respective row r of the target image. The algorithm logically iterates over each pixel in the target image. For each pixel at column c and row r, a target column t_c and a target row t_r are calculated. The target column t_c may be calculated by adding the x-offset for column c and row r from the x-offsets to the column c and rounding the result to an integer since the x-offset is floating point value. Likewise, the target column t_r may be calculated by adding the y-offset for column c and row r from the y-offsets to the row r and rounding the result to an integer value. The following equations represent the calculation of the target column t_c and the target row t_r for the pixel at column c and row r:

$$t\_c = \text{round}(X[c, r] + c)$$

$$t\_r = \text{round}(Y[c, r], +r)$$

Here, the parameter X[c, r] represents the x-offset value for the pixel at column c and row r from the x-offsets and y[c, r] represents the y-offset value for the pixel at column c and row r from the y-offsets.

Once the target column t_c and the target row t_r for the pixel at column c and row r is computed, the value in the thick pixel mask M for the pixel at column c and row r is added (accumulated) as represented by the following requestion:

$$A[t\_c, t\_r] = A[t\_c, t\_r] + M[c, r]$$

Once all pixels are considered, the thin pixel mask corresponds to values in the accumulator that are above a threshold value. For example, the threshold value can be two or greater, assuming the values in the thick pixel mask are zero (0) for outside the thick pixel mask and one (1) for within the thick pixel mask. The threshold value can be selected according to the requirements of the particular implementation at hand including based on the binary values used in the thick pixel mask to represent pixels within and outside the thick pixel mask.

Figure 6:
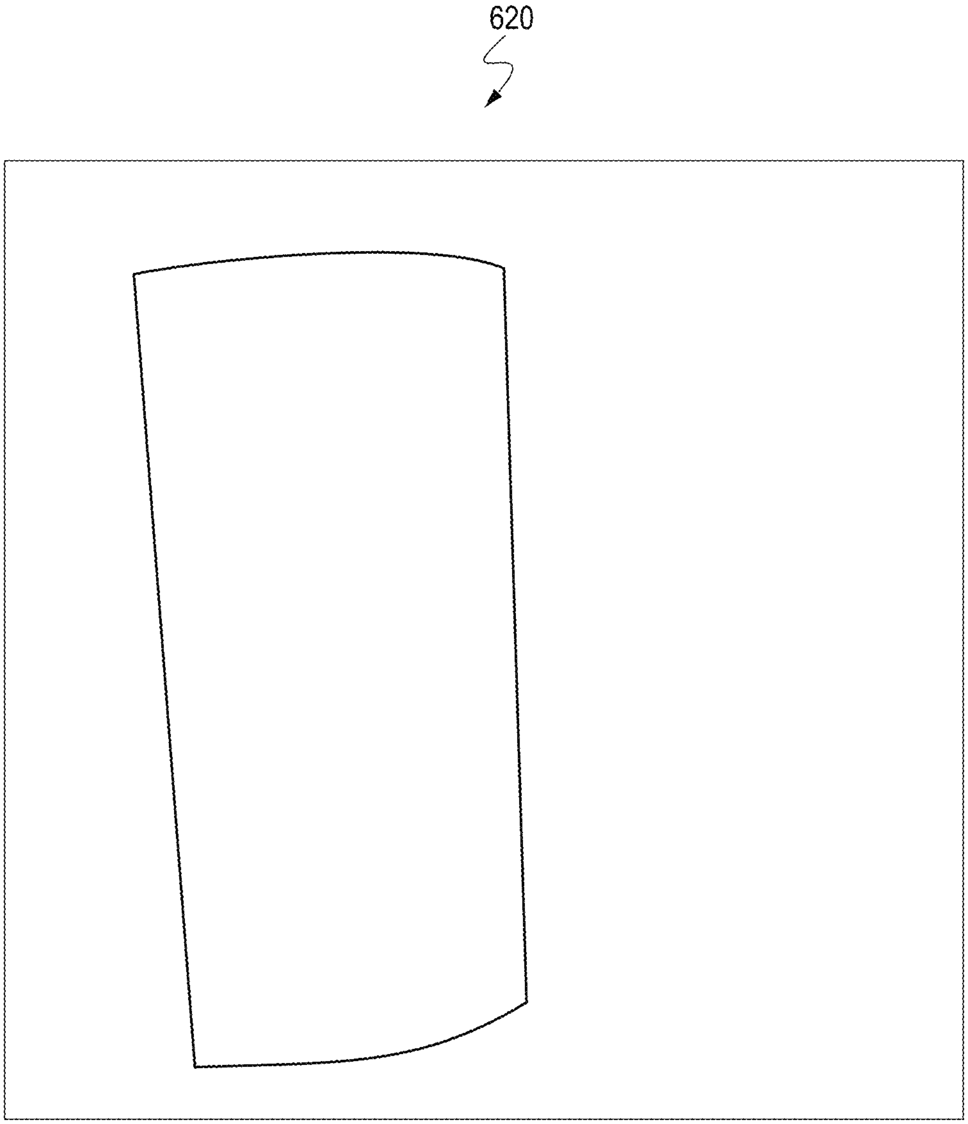
FIG. 6 illustrates a visualization of an example left page thin pixel mask determined by a thin pixel mask calculator for the left page of an example input image, in accordance with an embodiment of the present disclosure.
Figure 7:
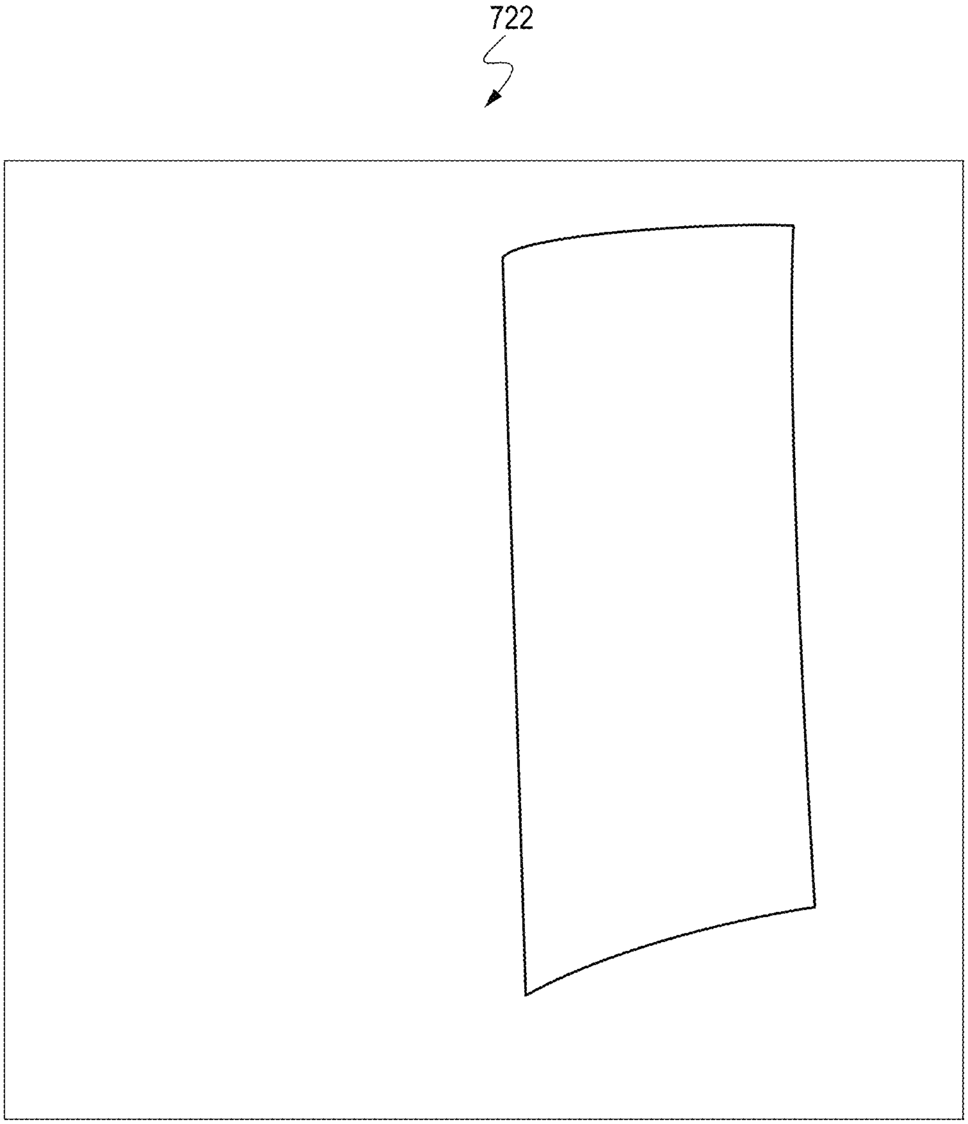
FIG. 7 illustrates a visualization of an example right page thin pixel mask determined by a thin pixel mask calculator for the right page of an example input image, in accordance with an embodiment of the present disclosure.

For example, FIG. 6 is an image visualization of left page thin pixel mask 620 produced by thin pixel mask calculator 118 for the left page of input image 402 of FIG. 4. Values in the accumulator for the left page at or above the threshold value (e.g., two) are represented by white pixels while values in the accumulator for the left page below the threshold value are represented by black pixels. And FIG. 7 is a like visualization of right page thin pixel mask 722 produced by thin pixel mask calculator 118 for the right page of input image 402 of FIG. 4 based on the values in the accumulator for the right page. Note how right page thin pixel mask 722 is thinner and more precisely delineates the right page boundary compared to right page thick pixel mask 512 output by model 104 for the right page of input image 402 of FIG. 4

In some embodiments, model 104 outputs 106, 108, 110, 112, 114, and 116 are upsampled before being input to thin pixel mask calculator 118. This is done to produce left page thin pixel mask 120 and right page thin pixel mask 122 that are thinner than they would be if the accumulator process described above is performed on the outputs without first upsampling. For example, outputs 106, 108, 110, 112, 114, and 116 of model 104 may originally each be the same size (dimension) as input image 102 which may be downsampled from its image capture size (resolution) as mentioned. For example, input image 102 and outputs 106, 108, 110,112, 114, and 116 may each be 384 by 384 or 512 by 512. After upsampling outputs 106, 108, 110,112, 114, and 116 (e.g., by a factor of two), the upsampled outputs 106, 108, 110, 112, 114, and 116 may be 768 by 768 or 1024 by 1024, respectively. Left page thick pixel mask 106 and right page thick pixel mask 112 can each be unsampled as images. Each of left page x-offsets 108, left page-y-offsets 110, right page x-offsets 114, and right page y-offsets 116 may be unsampled by multiplying the original x and y-offsets output by model 104 by the upscaling factor (e.g., two). The upsampled outputs 106, 108, 110, 112, 114, and 116 may be input to thin pixel mask calculator 118 to calculate left page thin pixel mask 120 and right page thin pixel mask 122 according to the accumulation process described above.

Note that in the case where outputs 106, 108, 110, 112, 114, and 116 are upsampled, the accumulator tensor used in the accumulator process described above may be larger in size (dimension) than input image 102. For example, if input image 102 is a 512 pixel by 512 pixel downsampled image and outputs 106, 108, 110, 112, 114, and 116 are upsampled by a scaling factor of two, then size (dimension) of the accumulator tensor in this example may be 1024 by 1024.

Figure 8:
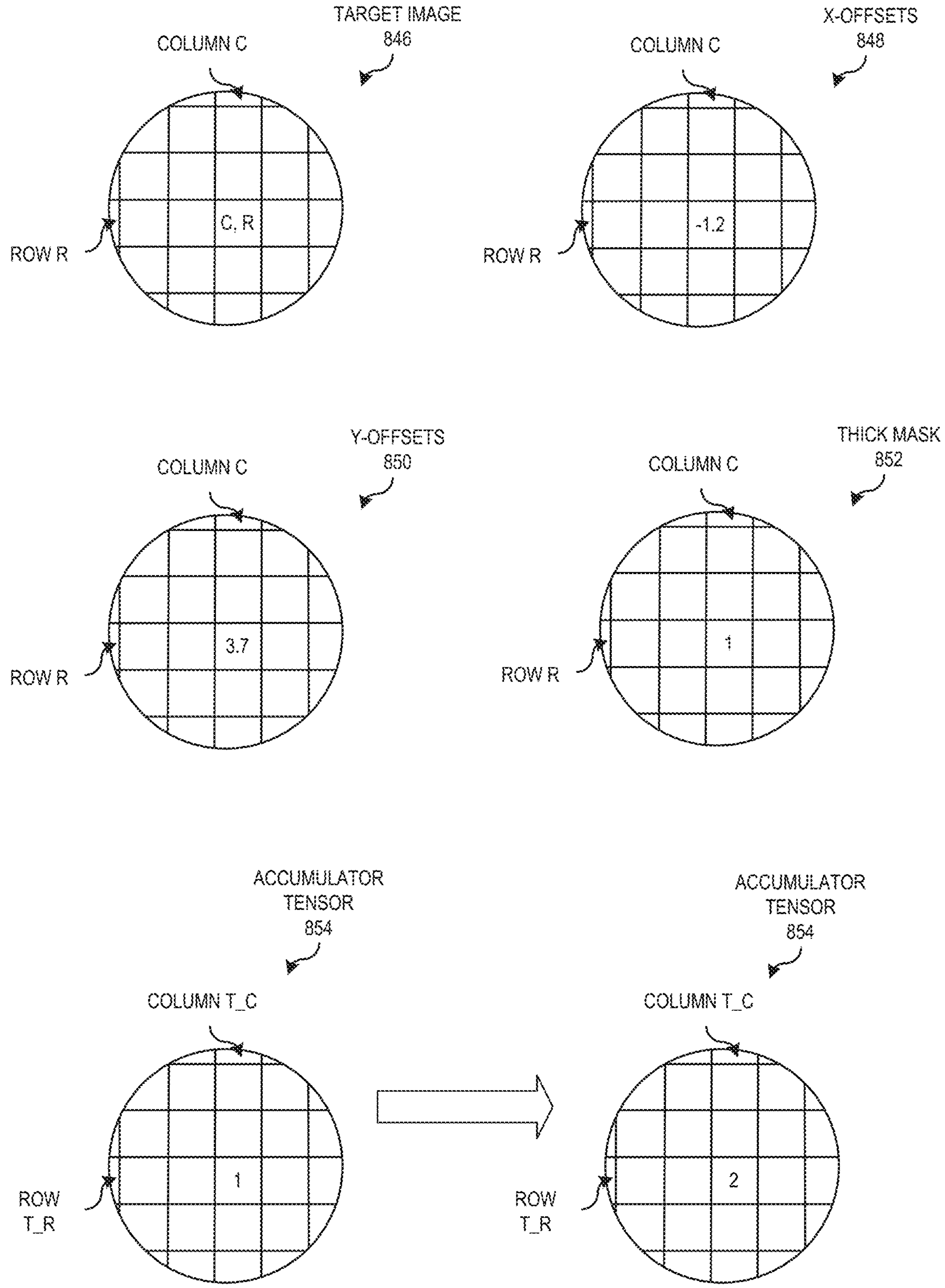
FIG. 8 illustrates an example of an accumulator process, in accordance with an embodiment of the present disclosure.

FIG. 8 illustrates the accumulator process by an example. Target image 846 has a target pixel at column c and row r. X-offsets 848 has an x-offset for the target pixel determined by model 104. Y-offsets 850 has a y-offset for the target pixel determined by model 104. The x-offset for the target pixel is the floating-point value −1.2 indicating that the target pixel is 1.2 pixels in the negative x-axis direction away from the page boundary as determined by model 104. The y-offset for the target pixel is the floating-point value 3.7 indicating that the target pixel is 3.7 pixels in the positive y-axis direction away from the page boundary as determined by model 104. Thick mask 852 indicates with the value 1 (e.g., as opposed to 0) that the target pixel is within the thick mask as determined by model 104. Accumulator tensor 854 representing target image 846 is updated. In particular, the value in accumulator tensor 854 representing the pixel of target image 846 at column t_c and row t_r is updated from its current value of 1 by adding the value 1 from thick mask 852 for column c and row r. The result is that the value in accumulator tensor 854 the pixel of target image 846 at column t_c and row t_r is now 2. Since the value is equal to greater than a threshold (e.g., two), the pixel of target image 846 at column t_c and row t_r is determined to be within the thin pixel mask for the page boundary.

Figure 9:
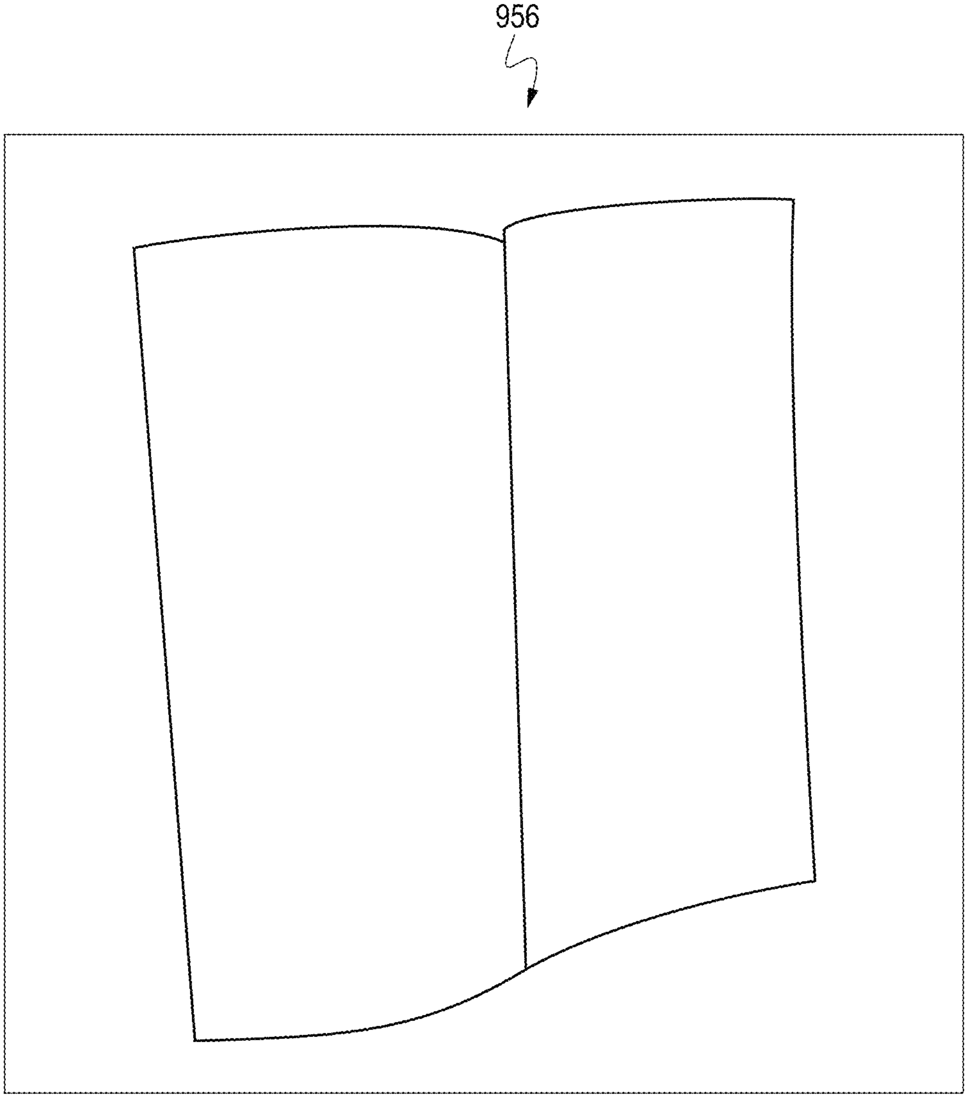
FIG. 9 illustrates a visualization of an example combined pixel mask combining an example left page thin pixel mask and an example right page thin pixel mask, in accordance with an embodiment of the present disclosure.

Left page thin pixel mask 120 and right page thin pixel mask 122 may each be a binary image where pixels along the page boundary (within the thin mask) are one value (e.g., one) and pixels not along the page boundary (outside the thin mask) are another value (e.g., zero). Left page thin pixel mask 120 and right page thin pixel mask 122 are input to spread boundary calculator 124. Spread boundary calculator 124 determines the external boundary of the spread encompassing a combination of the left and right page thin pixel masks 120 and 122. To do this, spread bound calculator 124 combines left page thin pixel mask 120 and right page thin pixel mask 122 to form a single "combined" image mask with the same size (dimension) as one of left page thin pixel mask 120 or the right page thin pixel mask 122. Spread boundary calculator 124 may generate the combination by initializing a pixel mask having a size (dimension) that is the same as left page thin pixel mask 120 or right page thin pixel mask 122 with zero values or default values. Then, spread boundary calculator 124 can set a pixel value in the combined pixel mask to indicate that the pixel is along a boundary of either the left page or the right page if that pixel is set as such in either the left page thin pixel mask 120 or the right page thin pixel mask 122. Alternatively, spread boundary calculator 124 can set the values within one of the thin masks 120 or 122 in the other of the masks to form the combined pixel mask. For example, FIG. 9 illustrates a visualization of combined pixel mask 956 combining left page thin pixel mask 620 of FIG. 6 and right page thin pixel mask 722 of FIG. 7.

Figure 10:
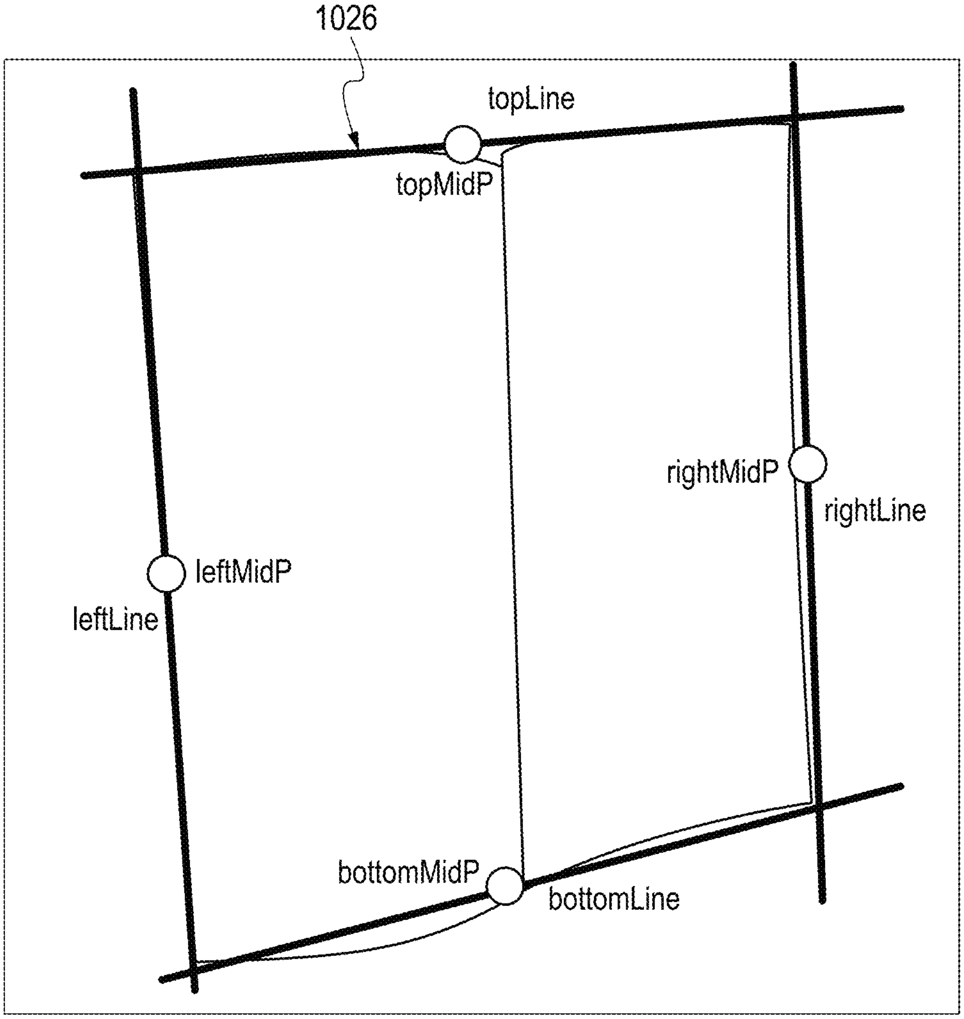
FIG. 10 illustrates a visualization of an example spread boundary determined by a spread boundary calculator from an example combined pixel mask, in accordance with an embodiment of the present disclosure.

Once the combined pixel mask is determined by spread boundary calculator 124, the external boundary of the spread in the combined pixel mask is calculated by spread boundary calculator 124 to yield spread boundary 126. Spread boundary 126 is a quadrilateral with edges and coordinates fit to the border of the spread in the combined pixel mask. The calculation of spread boundary 126 may involve computing Hough lines on each side of the spread in the combined pixel mask independently and determining a quadrilateral based on the intersection of the Hough lines. For example, FIG. 10 illustrates a visualization of spread boundary 1026 determined by spread boundary calculator 124 from combined pixel mask 956 of FIG. 9. As shown, spread boundary 1026 is a quadrilateral having a left-side line (leftLine) corresponding to the outer border of the left page, a right-side line (rightLine) corresponding to the outer border of the right page, a bottom line (bottomLine) corresponding to the bottom border of the spread, and a top line (topLine) corresponding to the top border of the spread. Each of these lines of the quadrilateral has a respective midpoint coordinate in combined pixel mask along the line of the quadrilateral referred to in FIG. 10 as leftMidP, rightMidP, bottomMidP, and topMidP, respectively.

Spread boundary 126 is input to bind line calculator 128 to determine best bind line 130. The bind line corresponds to the common line between the left page and the right page. The bind line is important to calculate because it can be useful to determine the individual left and right page boundaries as described in greater detail below.

Computation of the best bind line may begin by approximating the spread width based on the X coordinate of the left midpoint (leftMidP) of spread boundary 126 (leftMidP.X) and the X coordinate of the right midpoint (rightMidP) of spread bound 126 (rightMidP.X) (e.g., by subtracting leftMidP.X from rightMidP.X). The spread height is also approximated based on the Y coordinate of the top midpoint (topMidP) and the Y coordinate of the bottom midpoint (bottomMidP) (e.g., by subtracting bottomMidP.Y from topMidP.Y).

Next, a search region in the combined pixel mask to search for candidate bind lines may be defined. In some embodiments, the search region is represented by the following equations:

Horizontal=[leftMid*P.X*+30% of approximated spread width] to [rightMid*P.X*−30% of approximated spread width]

Vertical=[topMid*P.Y*−10% of approximated spread height] to [bottomMid*P.Y*+10% of approximated book height]

The above-equation results in a search region near 40% of the center of the spread. By focusing the search region on the center of the spread, gradients in input image 102 outside the spread boundary do not affect the search for candidate bind lines. Note that the percentage values 30%, 10%, and 40% above are chosen empirically in some embodiments but may vary from implementation to implementation according to the requirements of the particular implementation at hand.

Figure 11:
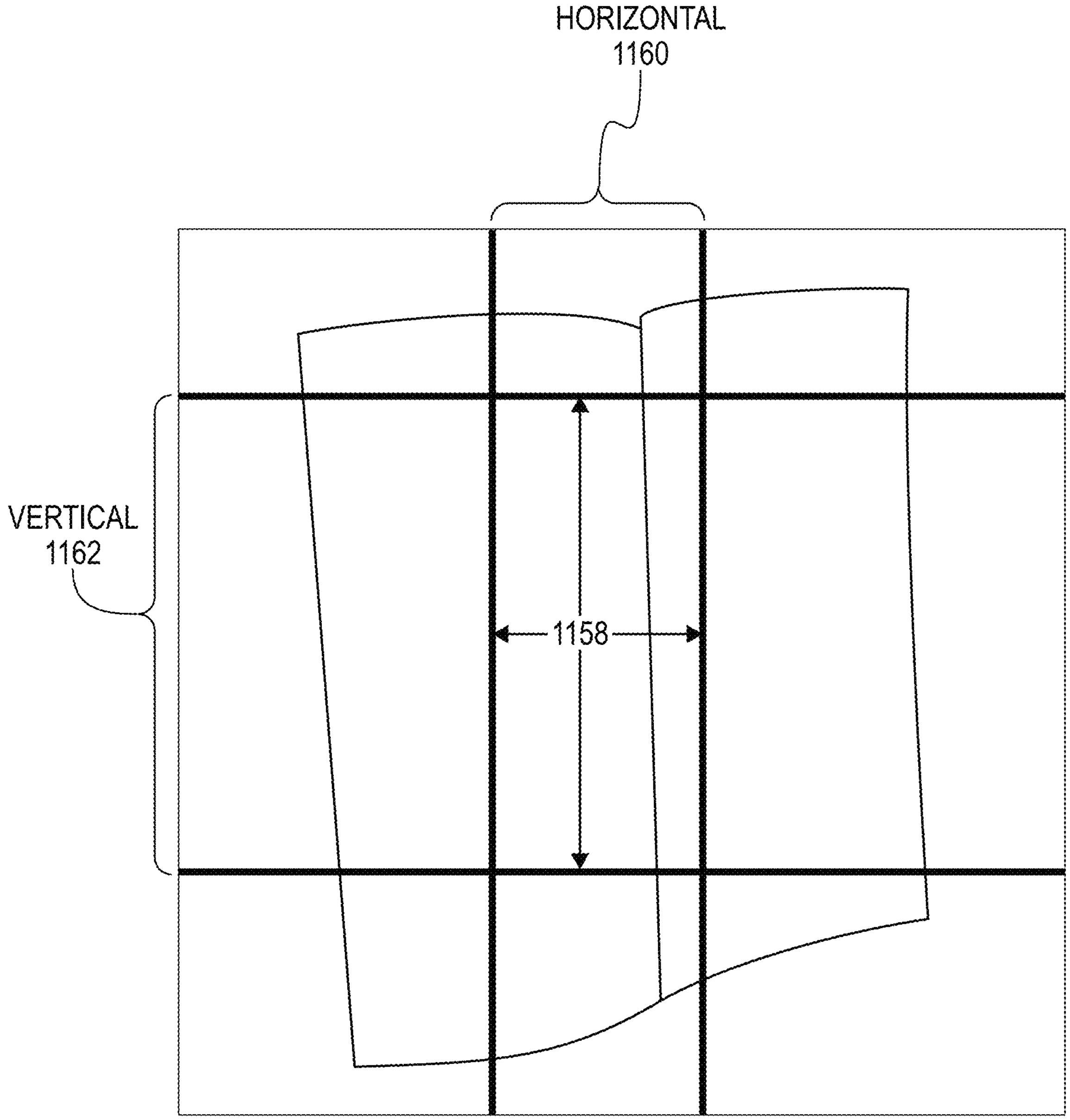
FIG. 11 illustrates a visualization of an example candidate bind line search region, in accordance with an embodiment of the present disclosure.

For example, FIG. 11 illustrates a visualization of example candidate bind line search region 1158 calculated based on spread boundary 1026 depicted in FIG. 10. Search region 1158 is a rectangular area having a horizontal width corresponding to horizontal 1160 and a vertical height corresponding to vertical 1162. Horizontal 1160 and vertical 1162 are calculated using the Horizontal and Vertical equations above, respectively.

Figure 12:
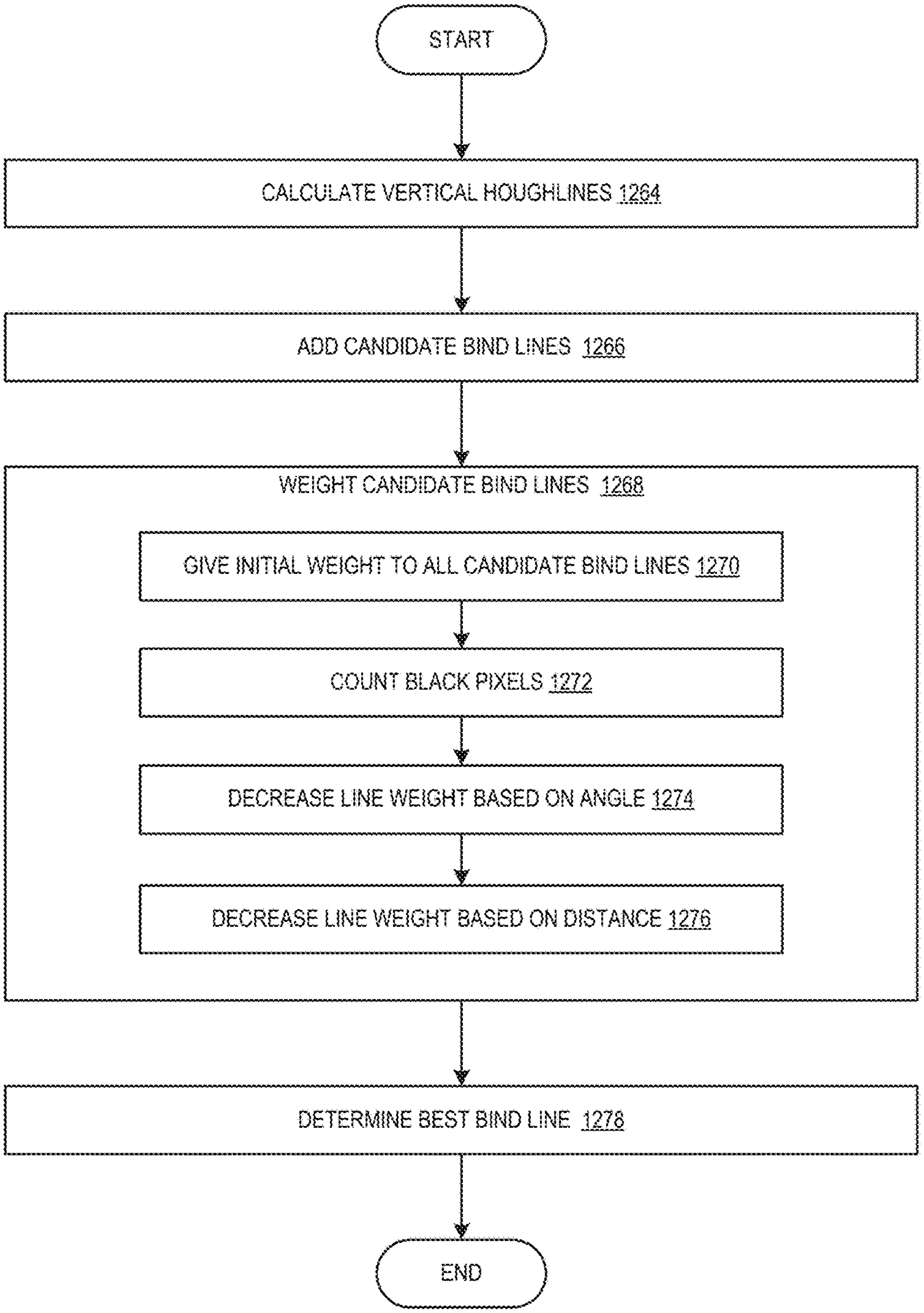
FIG. 12 is a flowchart of a method for determining the best bind line within a bind line search region, in accordance with an embodiment of the present disclosure.

FIG. 12 is a flowchart of a method for determining the best bind line. The method begins at operation 1264 where a set of vertical Hough lines within the bind line search region of a target image are calculated. The target image can be input image 102 as downsampled or a pre-downsampled version of input image 102.

Figure 13:
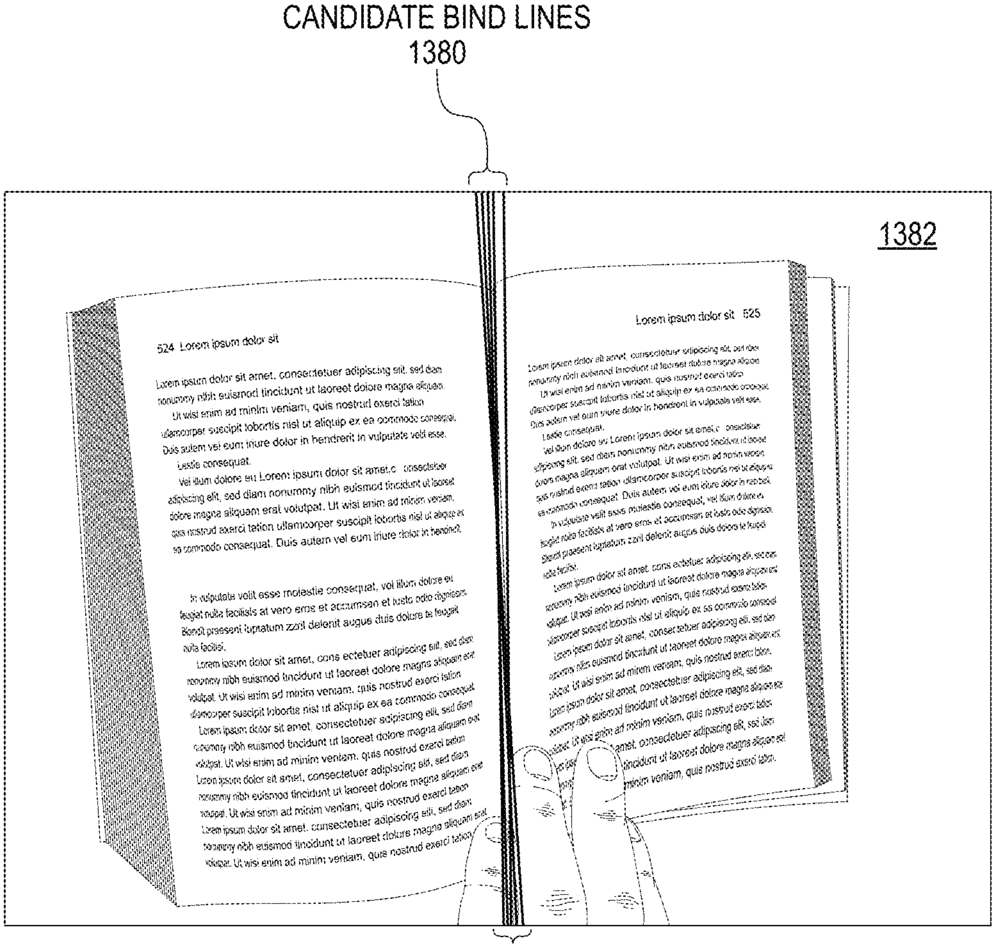
FIG. 13 illustrates an example set of candidate bind lines, in accordance with an embodiment of the present disclosure.

At operation 1266, the set of vertical Hough lines calculated at operation 1264 along with the centerline created by joining topMidP and bottomMidP are included in the set of candidate bind lines for consideration by remaining steps of the method. The centerline is a good candidate for the best bind line, especially if there are weak gradients in the target image near the bind line. FIG. 13 illustrates an example set of candidate bind lines 1380 determined for pre-downsampled version 1382 of input image 402 of FIG. 4.

At operation 1268, each of the candidate bind lines are assigned a weight according to sub-steps 1270, 1272, 1274, and 1276. Generally, operation 1268 and its sub-steps assign an initial weight to each Hough line candidate bind line and then possibly reduce the weight based on its determined distance from the centerline of spread boundary 126. An initial weight that is not reduced is assigned to the centerline candidate bind line. After operation 1268 is complete, the candidate bind line with the highest weight is selected 1278 as the best bind line. The best bind line can be one of the Hough line candidate bind lines with the highest weight. Alternatively, if the weights of all the Hough line candidate bind lines are reduced below the weight of the centerline candidate bind line, then the centerline candidate bind line is selected 1278 as the best bind line.

The initial weight assigned 1270 to the Hough line candidate bind lines may be higher than the initial weight assigned 1270 to the centerline candidate bind line. This is because the centerline candidate bind line is not reduced during the weight reduction sub-steps 1274 and 1276. The initial weight assigned 1270 to the Hough line candidate bind lines should be high enough to cover cases where the actual bind line in the target image has weak gradients and is away from the centerline candidate bind line such that the weight of the Hough line corresponding to the actual bind line is not reduced by the weight reduction sub-steps 1274 and 1276 below the weight of the centerline candidate bind line. For example, in some embodiments, the initial weight assigned 1270 to the Hough line candidate bind lines is 100 and the initial weight assigned 1270 to the centerline candidate bind line is 65. In some embodiments, these initial weight values are selected empirically or experimentally and may vary from implementation to implementation according to the requirements of the particular implementation at hand.

At sub-operation 1272, the number of black pixels (e.g., 0 valued) under each candidate bind line in a monochrome gradient bitmap image version or grayscale gradient bitmap image version of the target image is counted. The number of black pixels is added to the initial weight determined for the candidate bind line. The greater the number of black pixels underneath a candidate bind line, the stronger the gradients underneath the candidate bind line in the target image. The fewer the number of black pixels underneath a candidate bind line, the weaker the gradients underneath the candidate bind line in the target image. Stronger gradients underneath is more indicative of the actual bind line being along or close to the candidate bind line than weaker gradients.

At sub-operation 1274, the weight of each Hough line candidate bind line may be reduced based on the angle of the line from vertical. For example, the current weight of each Hough line candidate line may be reduced according to the following equation:

New Weight=(Current Weight)−(THETA*CONSTANT).

In the above, parameter THETA represents the absolute angle of the Hough line candidate bind line from vertical in the target image. The parameter CONSTANT represents an empirically or experimentally determined constant which may vary from implementation to implementation according to the requirements of the particular implementation at hand. In some embodiments, CONSTANT is 20.

At sub-operation 1276, the weight of each Hough line candidate bind line may be reduced based on its distance from the spread center. For example, the current weight of each Hough line candidate line may be reduced according to the following equations:

CONSTANT=1200/image Width lineMid*X*=*X* component of the Hough line candidate bind line at *Y*=(imageHeight/2)

spreadCenter*X*=(rightMid*P*.*X*−leftMid*P*.*X*)/2 spreadCenterDistance=spreadCenter*X*−lineMid*X*

New Weight=(Current Weight)−CONSTANT*absolute value of (spreadCenterDistance).

In the above, the 1200 factor of the parameter CONSTANT is selected empirically or experimentally and may vary from implementation according to the requirements of the particular implementation at hand. The parameters imageWidth and imageHeight represent the width and height of the target image in pixels, respectively. The parameter lineMidX represents the X component of the Hough line candidate bind line at the vertical center of the target image. The parameters rightMidP.X and leftMidP.X represent the X component of the left midpoint (leftMidP) of the left boundary of spread boundary 126 and the X component of the right midpoint (rightMidP) of the right boundary of spread boundary 126. The parameter spreadCenterX represents the center of the distance between leftMidP.X and rightMidP.X. The parameter spreadCenterDistance represents the distance between the spread center as represented by theparameter spreadCenterX and the Hough line candidate bind line as represented by the parameter lineMidX.

By sub-operations 1274 and 1276, Hough line candidate bind lines with strong gradients underneath but that are also away from the centerline of the spread will have their weights decreased, potentially below the weight of the centerline candidate bind line. In addition, Hough line candidate bind lines with weak gradients underneath that are close to the centerline of the spread will also have their weights decreased, potentially below the weight of the centerline candidate bind line.

Figure 14:
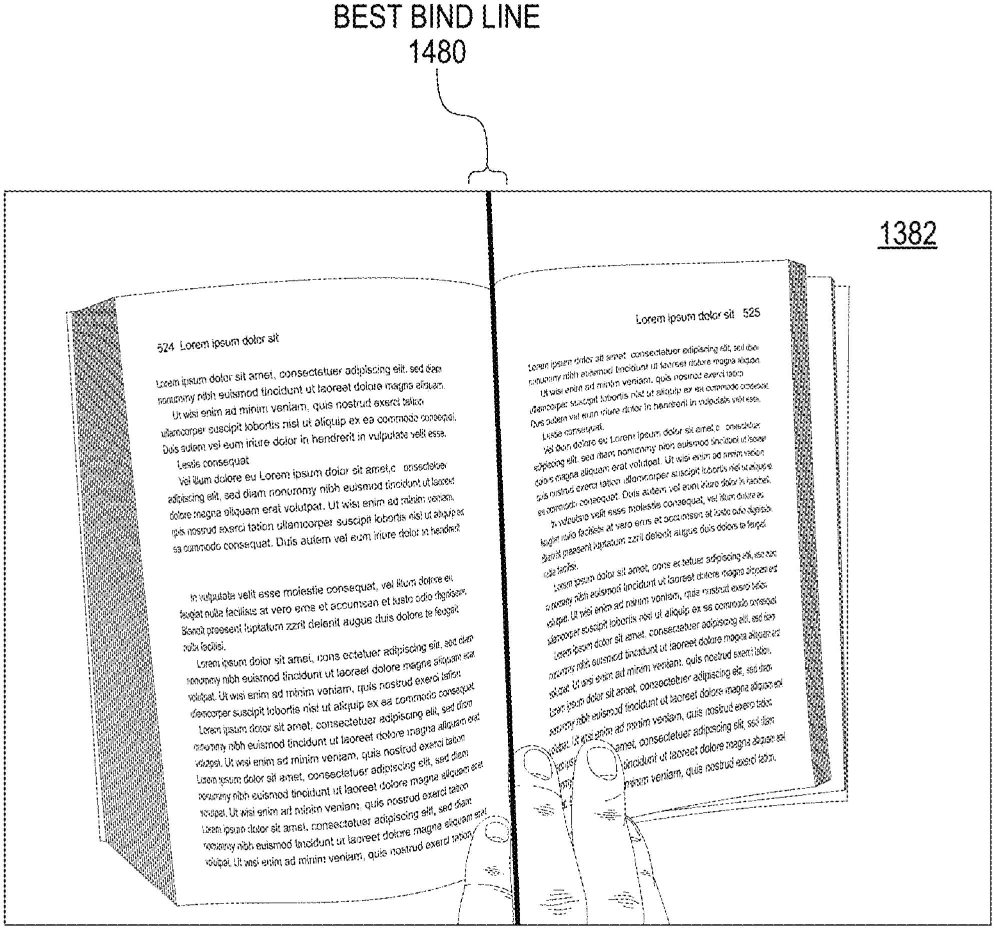
FIG. 14 illustrates an example best bind line, in accordance with an embodiment of the present disclosure.

At operation 1278, the candidate bind line with the highest weight is selected as the best bind line. For example, FIG. 14 illustrates best bind line 1480 determined for image 1382 of FIG. 13 among set of candidate bind lines 1380 of FIG. 13.

Returning to FIG. 1, once best bind line 130 is determined, it is input to individual page boundary calculator 132 which determines left quadrilateral 134 for the left page boundary and right quadrilateral 136 for the right page boundary based on best bind line 130 and spread boundary 126. For example, individual page boundary calculator 132 may determine the right border of left quadrilateral 134 and the left border of right quadrilateral 136 to follow best bind line, determine the top border of left quadrilateral 134 and the top border of right quadrilateral 136 to follow the top border of spread boundary 126, determine the bottom border of left quadrilateral 134 and the bottom border of right quadrilateral 136 to follow the bottom border of spread boundary 126, and determine the left border of left quadrilateral 134 and the right border of right quadrilateral 136 to follow the left border of spread boundary 126 and the right border of spread boundary 126, respectively.

Left quadrilateral 134 and right quadrilateral 136 may be displayed as overlays in output image 138 to a user such as, for example, as depicted in FIG. 2 and FIG. 3.

FIG. 15 illustrates a schematic diagram of precise book page boundary detection system 1500 (e.g., "system 100" described above) in accordance with one or more embodiments. System 1500 can be used to efficiently compute thin and precise page boundaries of individual book pages from a single image of a two-page spread of the book. System 1500 can be used to compute the best bind line from a set of candidate bind lines that best fit the actual bind line of the spread. System 1500 saves times for users of image capturing devices (e.g., smart phones and tablet computers) because individual book page boundaries are automatically computed from a single image capture (e.g., a single photograph of the book spread or a single full video frame from a video of the book spread). As a result, users do not need to capture the left and right pages of the book separately. System 1500 can also be used to perform a bulk scan a books faster and with greater precision.

As shown, precise book page boundary detection system 1500 includes page boundary deep machine learning model 1502, thin pixel mask calculator 1504, spread boundary calculator 15)6, bind line calculator 1508, and individual page boundary calculator 1510. The storage manager 1512 includes input image 1514, output image 1516, left page model outputs 1518, right page model outputs 1520, left page thin pixel mask 1522, right page thin pixel mask 1524, spread boundary 1526, bind line 1528, left quadrilateral 1530, and right quadrilateral 1532.

In operation, page boundary deep machine learning model 1502 (e.g., model 104 of system 100) takes input image 1514 as input. Input image 1514 may be a digital image or a digital video frame of a physical book laid open to a two-page spread. Page bound deep machine learning model 15012 is trained to process input image 1514 and generate left page model outputs 1518 and right page model outputs 1520. Left page model outputs 1518 include a thick pixel mask (e.g., 106), a x-offsets tensor (e.g., 108), and a y-offsets tensor (e.g., 110) for the left page of the spread in input image 1514. Right page model outputs 1520 includes a thick pixel mask (e.g., 112), a x-offsets tensor (e.g., 114), and a y-offsets tensor (e.g., 116) for the right page of the spread in input image 1514. Left page model outputs 1518 and right page model outputs 1520 are input to thin pixel mask calculator 1504. Thin pixel mask calculator 1504 generates left page thin pixel mask 1522 (e.g., 120) for the left page from left page model outputs 1518 and generates right page thin pixel mask 1524 (e.g., 122) for the right page from the right page model outputs 1520. Left page thin pixel mask 1522 and right page thin pixel mask 1524 are input to spread boundary calculator 1506 which determines the external bound of the spread as spread boundary 1526 (e.g., 126) Spread boundary 1526 encompasses data representing a quadrilateral the delineates the external boundary of the spread. Spread boundary 1526 is input to bind line calculator 1508 which determines best bind line 1528 (e.g., 130) based on spread boundary 1526. Both best bind line 1528 and spread boundary 1526 are input to individual page boundary calculator 1510 which determines left quadrilateral 1530 (e.g., 134) for the left page and right quadrilateral 1532 (e.g., 136) for the right page. At least one of left quadrilateral 1530 or right quadrilateral 1532 is rendered in output image 1516. Output image 1516 shows the two-page spread of input image 1514 with at least one of left quadrilateral 1530 or right quadrilateral 1532 delineating the external boundary of the left page or right page, respectively.

Each of the components 1502-1510 of the precise book page boundary system 1500 and their corresponding elements (as shown in FIG. 15) may be in communication with one another using any suitable communication technologies. It will be recognized that although components 1502-1510 and their corresponding elements are shown to be separate in FIG. 15, any of components 1502-1510 and their corresponding elements may be combined into fewer components, such as into a single facility or module, divided into more components, or configured into different components as may serve a particular embodiment.

The components 1502-1510 and their corresponding elements can comprise software, hardware, or both. For example, the components 1502-1510 and their corresponding elements can comprise one or more instructions stored on a computer-readable storage medium and executable by processors of one or more computing devices. When executed by the one or more processors, the computer-executable instructions of the precise book page boundary detection system 1500 can cause a client device and/or a server device to perform the methods described herein. Alternatively, the components 1502-1510 and their corresponding elements can comprise hardware, such as a special purpose processing device to perform a certain function or group of functions. Additionally, the components 1502-1510 and their corresponding elements can comprise a combination of computer-executable instructions and hardware.

Furthermore, the components 1502-1510 of the precise book page boundary detection system 1500 may, for example, be implemented as one or more stand-alone applications, as one or more modules of an application, as one or more plug-ins, as one or more library functions or functions that may be called by other applications, and/or as a cloud-computing model. Thus, the components 1502-1510 of the precise book page boundary detection system 1500 may be implemented as a stand-alone application, such as a desktop or mobile application. Furthermore, the components 1502-1510 of the precise book page boundary detection system 1500 may be implemented as one or more web-based applications hosted on a remote server. Alternatively, or additionally, the components of the precise book page boundary detection system 1500 may be implemented in a suite of mobile device applications or "apps."

As shown, the precise book page boundary detection system 1500 can be implemented as a single system. In other embodiments, the precise book page boundary detection system 1500 can be implemented in whole, or in part, across multiple systems. For example, one or more functions of the precise book page boundary detection system 1500 can be performed by one or more servers, and one or more functions of the precise book page boundary detection system 1500 can be performed by one or more client devices. The one or more servers and/or one or more client devices may generate, store, receive, and transmit any type of data used by the precise book page boundary detection system 1500, as described herein.

In one implementation, the one or more client devices can include or implement at least a portion of the precise book page boundary detection system 1500. In other implementations, the one or more servers can include or implement at least a portion of the precise book page boundary detection system 1500. For instance, the precise book page boundary detection system 1500 can include an application running on the one or more servers or a portion of the precise book page boundary detection system 1500 can be downloaded from the one or more servers. Additionally or alternatively, the precise book page boundary detection system 1500 can include a web hosting application that allows the client device(s) to interact with content hosted at the one or more server(s).

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 17. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 17.

The server(s) may include one or more hardware servers (e.g., hosts), each with its own computing resources (e.g., processors, memory, disk space, networking bandwidth, etc.) which may be securely divided between multiple customers (e.g., client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 17.

Figure 16:
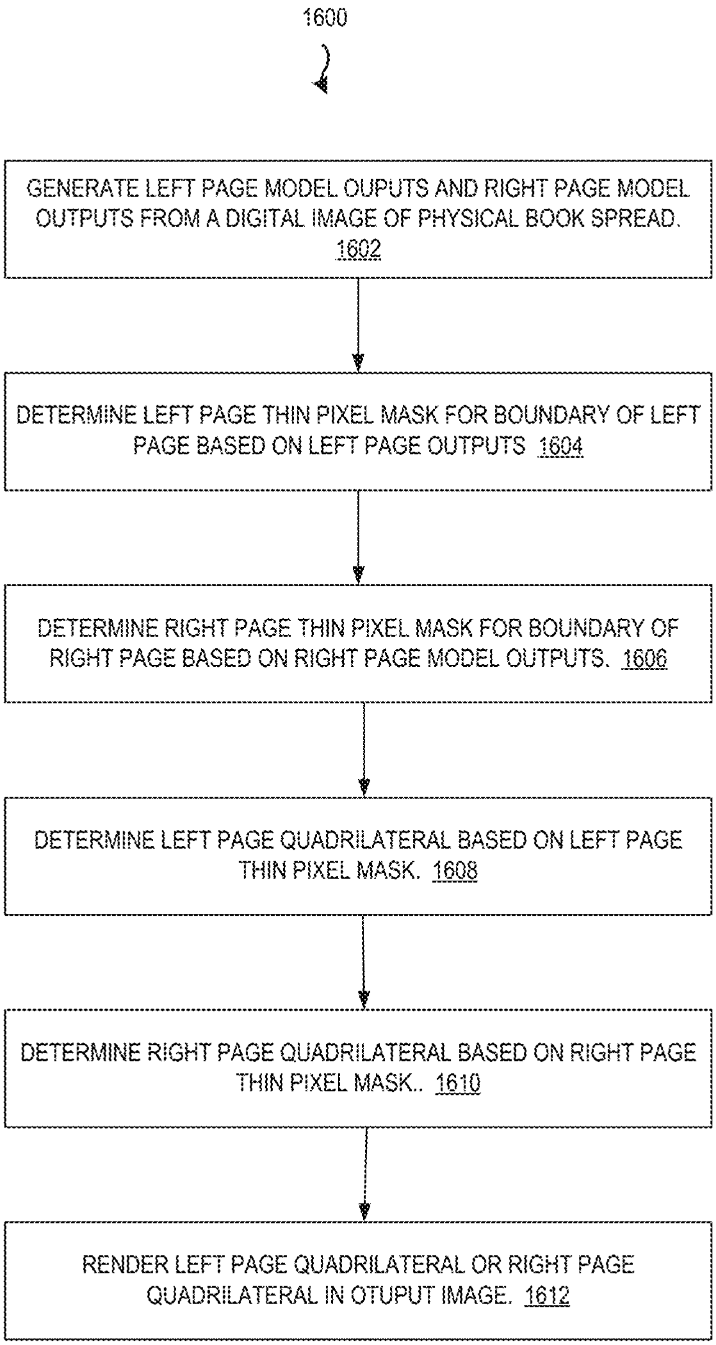
FIG. 16 illustrates a flowchart of a series of acts in a method of precise book page boundary detection, in accordance with one or more embodiments.

FIGS. 1-15, the corresponding text, and the examples, provide a number of different systems and devices that allows a user to automatically determine precise page boundaries of a physical book or the like open to a two-spread from a single image capture. In addition to the foregoing, embodiments can also be described in terms of flowcharts comprising acts and steps in a method for accomplishing a particular result. For example, FIG. 16 illustrates a flowchart of an exemplary method in accordance with one or more embodiments. The method described in relation to FIG. 16 may be performed with fewer or more steps/acts or the steps/acts may be performed in differing orders. Additionally, the steps/acts described herein may be repeated or performed in parallel with one another or in parallel with different instances of the same or similar steps/acts.

FIG. 16 illustrates a flowchart of a series of acts in a method 1600 of precise book page boundary detection using machine learning model and processing techniques, in accordance with one or more embodiments. In one or more embodiments, the method 1600 is performed by an image capturing device (e.g., a smart phone or a tablet computer) that includes the precise book page boundary detection system 1500. The method 1600 is intended to be illustrative of one or more methods in accordance with the present disclosure and is not intended to limit potential embodiments. Alternative embodiments can include additional, fewer, or different steps than those articulated in FIG. 16.

As illustrated in FIG. 16, the method 1600 includes an act 1602 of the image capturing device using a convolutional neural segmentation network (e.g., model 104) to generate left page model outputs (e.g., outputs 106, 108, and 110) and right page model outputs (e.g., 112, 114, and 116) from a digital image (e.g., 102) of a physical book laid open to a two-page spread having a left page and a right page. In some embodiments, the image capturing device downsamples a digital image captured by the image capturing device and the convolutional neural segmentation network generates the left page and right model outputs from the downsampled version of the digital image.

The method 1600 further includes the act 1604 of the image capturing device determining a left page thin pixel mask (e.g., 120) for an outer boundary of the left page based on the left page model outputs.

In some embodiments, determining the left page thin pixel mask by the image capturing device is based on all of: a left page thick pixel mask for the outer boundary of the left page of the left page model outputs, a left page x-offset tensor for the outer boundary of the left page of the left page model outputs, and a left page y-offset tensor for the outer boundary of the left page of the left page model outputs.

In some embodiments, determining the left page thin pixel mask by the image capturing device is based on accumulating a set of values in an accumulator tensor representing a grid of image pixels based on the left page thick pixel mask, the left page x-offset tensor, and the left page y-offset tensor.

The method 1600 further includes the act 1606 of the image capturing device determining a right page thin pixel mask (e.g., 122) for an outer boundary of the right page based on right page model outputs.

In some embodiments, determining the right page thin pixel mask by the image capturing device is based on all of: a right page thick pixel mask for the outer boundary of the right page of the right page model outputs, a right page x-offset tensor for the outer boundary of the right page of the right page model outputs, and a right page y-offset tensor for the outer boundary of the right page of the right page model outputs.

In some embodiments, determining the right page thin pixel mask by the image capturing device is based on accumulating a set of values in an accumulator tensor representing a grid of image pixels based on the right page thick pixel mask, the right page x-offset tensor, and the right page y-offset tensor.

The method 1600 further includes the act 1608 of the image capturing device determining a left page quadrilateral (e.g., 134) for the outer boundary of the left page based on the left page thin pixel mask.

The method 1600 further includes the act 1610 of the image capturing device determining a right page quadrilateral (e.g., 136) for the outer boundary of the right page based on the right page thin pixel mask.

In some embodiments, the image capturing device determines the left page quadrilateral and the right page quadrilateral based on a bind line of the two-page spread. The image capturing device determines the bind line based on a set of Hough lines determined within a bind line search region of a digital image of the two-page spread. The bind line search region is determined based on an output boundary of the two-page spread and determined such that it is entirely within the outer boundary of the two-page spread. In some embodiments, a particular one of the Hough lines is selected as the bind line based on a distance of the particular Hough line from a center of the two-page spread, an angle of the particular Hough line relative to a vertical line of the two-page spread, or a strength of a gradient underneath the particular Hough line.

The method 1600 further includes the act 1612 of the image capturing device rendering at least one of the left page quadrilateral or the right page quadrilateral in an output image (e.g., 138) that is displayed in a video display.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 17:
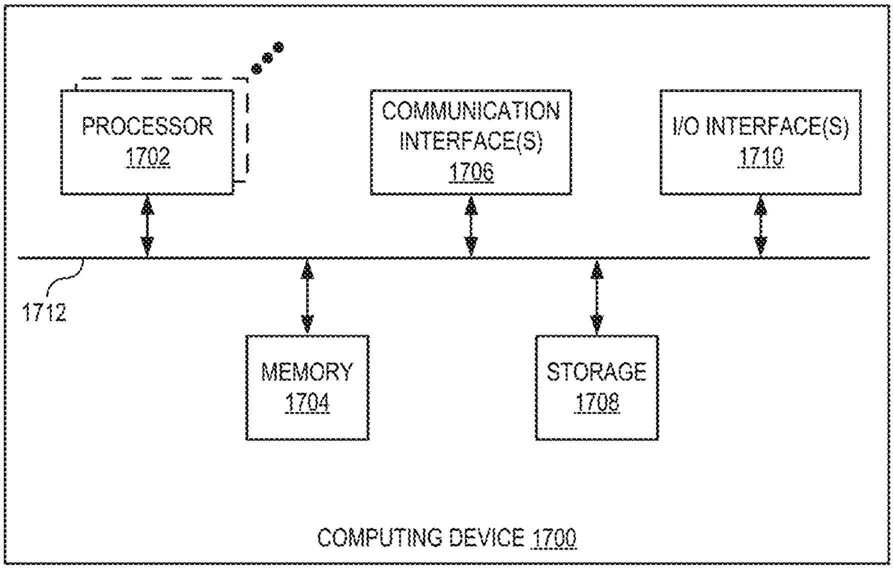
FIG. 17 illustrates a block diagram of an exemplary computing device in accordance with one or more embodiments.

FIG. 17 illustrates, in block diagram form, an exemplary computing device 1700 that may be configured to perform one or more of the processes described above. One will appreciate that one or more computing devices such as the computing device 1700 may implement the precise book page boundary detection system. As shown by FIG. 17, the computing device can comprise a processor 1702, memory 1704, one or more communication interfaces 1706, a storage device 1708, and one or more I/O devices/interfaces 1710. In certain embodiments, the computing device 1700 can include fewer or more components than those shown in FIG. 17. Components of computing device 1700 shown in FIG. 17 will now be described in additional detail.

In particular embodiments, processor(s) 1702 includes hardware for executing instructions, such as those making up a computer program. As an example, and not by way of limitation, to execute instructions, processor(s) 1702 may retrieve (or fetch) the instructions from an internal register, an internal cache, memory 1704, or a storage device 1708 and decode and execute them. In various embodiments, the processor(s) 1702 may include one or more central processing units (CPUs), graphics processing units (GPUs), field programmable gate arrays (FPGAs), systems on chip (SoC), or other processor(s) or combinations of processors.

The computing device 1700 includes memory 1704, which is coupled to the processor(s) 1702. The memory 1704 may be used for storing data, metadata, and programs for execution by the processor(s). The memory 1704 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1704 may be internal or distributed memory.

The computing device 1700 can further include one or more communication interfaces 1706. A communication interface 1706 can include hardware, software, or both. The communication interface 1706 can provide one or more interfaces for communication (such as, for example, packet-based communication) between the computing device and one or more other computing devices 1700 or one or more networks. As an example and not by way of limitation, communication interface 1706 may include a network interface controller (NIC) or network adapter for communicating with an Ethernet or other wire-based network or a wireless NIC (WNIC) or wireless adapter for communicating with a wireless network, such as a WI-FI. The computing device 1700 can further include a bus 1712. The bus 1712 can comprise hardware, software, or both that couples components of computing device 1700 to each other.

The computing device 1700 includes a storage device 1708 includes storage for storing data or instructions. As an example, and not by way of limitation, storage device 1708 can comprise a non-transitory storage medium described above. The storage device 1708 may include a hard disk drive (HDD), flash memory, a Universal Serial Bus (USB) drive or a combination these or other storage devices. The computing device 1700 also includes one or more input or output ("I/O") devices/interfaces 1710, which are provided to allow a user to provide input to (such as user strokes), receive output from, and otherwise transfer data to and from the computing device 1700. These I/O devices/interfaces 1710 may include a mouse, keypad or a keyboard, a touch screen, camera, optical scanner, network interface, modem, other known I/O devices or a combination of such I/O devices/interfaces 1710. The touch screen may be activated with a stylus or a finger.

The I/O devices/interfaces 1710 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1710 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

What is claimed is:

1. A method comprising:

receiving a digital image;

obtaining a plurality of outputs based on inputting the digital image to a convolutional neural segmentation network, the plurality of outputs comprising a first output and a second output, the first output for a first outer boundary of a left page of a two-page spread of a physical book, the second output for a second outer boundary of a right page of the two-page spread, each output including a thick pixel mask and x-offset and y-offset tensors storing distance values to nearest points on respective outer boundaries;

determining a first thin pixel mask for the first outer boundary based on the first output;

determining a second thin pixel mask for the second outer boundary based on the second output;

determining a first quadrilateral for the first outer boundary based on the first thin pixel mask;

determining a second quadrilateral for the second outer boundary based on the second thin pixel mask; and presenting the first quadrilateral and the second quadrilateral for display in a graphical user interface.

2. The method of claim 1, wherein:

the first output comprises a first thick pixel mask, a first x-offset tensor, and a first y-offset tensor;

the second output comprises a second thick pixel mask, a second x-offset tensor, and a second y-offset tensor;

determining the first thin pixel mask is based on the first thick pixel mask, the first x-offset tensor, and the first y-offset tensor for the first outer boundary; and determining the second thin pixel mask is based on the second thick pixel mask, the second x-offset tensor, and the second y-offset tensor.

3. The method of claim 2, wherein:

determining the first thin pixel mask is based on accumulating a first set of values in an accumulator tensor representing a grid of image pixels based on the first thick pixel mask, the first x-offset tensor, and the first y-offset tensor; and determining the second thin pixel mask is based on accumulating a second set of values in an accumulator tensor representing a grid of image pixels based on the second thick pixel mask, the second x-offset tensor, and the second y-offset tensor.

4. The method of claim 3, wherein:

the digital image is a downsampled version of a source digital image, the downsampled version having an image resolution;

a grid of pixels represented by an accumulator tensor has width and height dimensions that are a scaling factor greater than the image resolution of the downsampled version;

accumulating the first set of values in an accumulator tensor is based on the scaling factor; and accumulating the second set of values in an accumulator tensor is based on the scaling factor.

5. The method of claim 1, further comprising:

determining an outer boundary of the two-page spread;

determining a bind line search region of a digital image based on the outer boundary;

wherein the bind line search region is entirely within the outer boundary;

determining a set of one or more Hough lines within the bind line search region; and determining a bind line of the two-page spread based on the set of one or more Hough lines.

6. The method of claim 5, wherein:

the set of one or more Hough lines comprises a plurality of Hough lines;

determining the bind line of the two-page spread is based on selecting a particular Hough line of the plurality of Hough lines; and selecting the particular Hough line of the plurality of Hough lines is based on a distance of the particular Hough line from a center of the two-page spread, an angle of the particular Hough line relative to a vertical line of the two-page spread, or a strength of a gradient underneath the particular Hough line.

7. The method of claim 1, wherein the convolutional neural segmentation network is trained using a loss function that masks page boundary x-offset outputs and page boundary y-offset outputs with a ground truth page boundary pixel mask.

8. A non-transitory computer-readable medium storing executable instructions which, when executed by a processing device, cause the processing device to perform operations comprising:

obtaining a digital image captured by a digital camera; wherein the digital image comprises a spread of a physical book;

inputting the digital image to a convolutional neural segmentation network to obtain a plurality of outputs; wherein the plurality of outputs comprise first output and second output, the first output for a first boundary of a left page of the spread, the second output for a second boundary of a right page of the spread, each output including a thick pixel mask and x-offset and y-offset tensors storing distance values to nearest points on respective outer boundaries;

determining a first thin pixel mask for the first boundary based on the first output;

determining a second thin pixel mask for the second boundary based on the second output;

determining, based on the first thin pixel mask and the second thin pixel mask, a first quadrilateral for the first boundary and a second quadrilateral for the second boundary; and displaying at least one of the first quadrilateral for the first boundary or the second quadrilateral for the second boundary in a graphical user interface.

9. The non-transitory computer-readable medium of claim 8, wherein:

the first output comprises a first thick pixel mask, a first x-offset tensor, and a first y-offset tensor;

the second output comprises a second thick pixel mask, a second x-offset tensor, and a second y-offset tensor;

determining the first thin pixel mask is based on the first thick pixel mask, the first x-offset tensor, and the first y-offset tensor; and determining the second thin pixel mask is based on the second thick pixel mask, the second x-offset tensor, and the second y-offset tensor.

10. The non-transitory computer-readable medium of claim 9, wherein:

determining the first thin pixel mask is based on accumulating a first set of values in an accumulator tensor representing a grid of image pixels based on the first thick pixel mask, the first x-offset tensor, and the first y-offset tensor; and determining the second thin pixel mask is based on accumulating a second set of values in an accumulator tensor representing a grid of image pixels based on the second thick pixel mask, the second x-offset tensor, and the second y-offset tensor.

11. The non-transitory computer-readable medium of claim 10, wherein:

the digital image is a downsampled version of a source digital image, the downsampled version having an image resolution;

a grid of pixels represented by an accumulator tensor has width and height dimensions that are a scaling factor greater than the image resolution of the downsampled version;

accumulating the first set of values in an accumulator tensor is based on the scaling factor; and accumulating the second set of values in an accumulator tensor is based on the scaling factor.

12. The non-transitory computer-readable medium of claim 8, further storing executable instructions which, when executed by the processing device, cause the processing device to perform operations comprising:

determining an outer boundary of the spread;

determining a bind line search region of a digital image based on the outer boundary;

wherein the bind line search region is entirely within the outer boundary;

determining a set of one or more Hough lines within the bind line search region; and determining a bind line of the spread based on the set of one or more Hough lines.

13. The non-transitory computer-readable medium of claim 12, wherein:

the set of one or more Hough lines comprises a plurality of Hough lines;

determining the bind line of the spread is based on selecting a particular Hough line of the plurality of Hough lines; and selecting the particular Hough line of the plurality of Hough lines is based on a distance of the particular Hough line from a center of the spread, an angle of the particular Hough line relative to a vertical line of the spread, or a strength of a gradient underneath the particular Hough line.

14. A system comprising:

a set of one or more memory components; and a set of one or more processing devices coupled to the set of one or more memory components, the set of one or more processing devices to perform a set of operations comprising:

receiving a digital image;

obtaining, based on inputting the digital image to a convolutional neural segmentation network, a plurality of outputs comprising first output and second output, the first output for a first boundary of a left page of a two-page spread of a physical book, the second output for a second boundary of a right page of the two-page spread, each output including a thick pixel mask and x-offset and y-offset tensors storing distance values to nearest points on respective outer boundaries;

determining a first thin pixel mask for the first boundary based on the first output;

determining a second thin pixel mask for the second boundary based on the second output;

determining a first quadrilateral for the first boundary based on the first thin pixel mask;

determining a second quadrilateral for the second boundary based on the second thin pixel mask; and presenting the first quadrilateral and the second quadrilateral for display in a graphical user interface.

15. The system of claim 14, wherein:

the first output comprises a first thick pixel mask, a first x-offset tensor, and a first y-offset tensor;

the second output comprises a second thick pixel mask, a second x-offset tensor, and a second y-offset tensor;

determining the first thin pixel mask is based on the first thick pixel mask, the first x-offset tensor, and the first y-offset tensor; and determining the second thin pixel mask is based on the second thick pixel mask, the second x-offset tensor, and the second y-offset tensor.

16. The system of claim 15, wherein:

determining the first thin pixel mask is based on accumulating a first set of values in an accumulator tensor representing a grid of image pixels based on the first thick pixel mask, the first x-offset tensor, and the first y-offset tensor; and determining the second thin pixel mask is based on accumulating a second set of values in an accumulator tensor representing a grid of image pixels based on the second thick pixel mask, the second x-offset tensor, and the second y-offset tensor.

17. The system of claim 16, wherein:

the digital image is a downsampled version of a source digital image, the downsampled version having an image resolution;

a grid of pixels represented by an accumulator tensor has width and height dimensions that are a scaling factor greater than the image resolution of the downsampled version;

accumulating the first set of values in an accumulator tensor is based on the scaling factor; and accumulating the second set of values in an accumulator tensor is based on the scaling factor.

18. The system of claim 14, the set of one or more processing devices to further perform operations comprising:

determining an outer boundary of the two-page spread;

determining a bind line search region of a digital image based on the outer boundary;

wherein the bind line search region is entirely within the outer boundary;

determining a set of one or more Hough lines within the bind line search region; and determining a bind line of the two-page spread based on the set of one or more Hough lines.

19. The system of claim 18, wherein:

the set of one or more Hough lines comprises a plurality of Hough lines;

determining the bind line of the two-page spread is based on selecting a particular Hough line of the plurality of Hough lines; and selecting the particular Hough line of the plurality of Hough lines is based on a distance of the particular Hough line from a center of the two-page spread, an angle of the particular Hough line relative to a vertical line of the two-page spread, or a strength of a gradient underneath the particular Hough line.

20. The system of claim 18, wherein the convolutional neural segmentation network is trained using a loss function that masks page boundary x-offset outputs and page boundary y-offset outputs with a ground truth page boundary pixel mask.

* * * * *